(12) United States Patent
Dauphiny et al.

(10) Patent No.: US 10,434,418 B2
(45) Date of Patent: Oct. 8, 2019

(54) NAVIGATION AND INTERACTION CONTROLS FOR THREE-DIMENSIONAL ENVIRONMENTS

(71) Applicant: Microsoft Technology Licensing, LLC, Redmond, WA (US)

(72) Inventors: Michelle Lee Dauphiny, Bellevue, WA (US); Jason Cahill, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/373,447

(22) Filed: Dec. 8, 2016

(65) Prior Publication Data

US 2017/0352186 A1    Dec. 7, 2017

Related U.S. Application Data

(60) Provisional application No. 62/345,623, filed on Jun. 3, 2016.

(51) Int. Cl.
*A63F 13/5378* (2014.01)
*A63F 13/73* (2014.01)
(Continued)

(52) U.S. Cl.
CPC .............. *A63F 13/73* (2014.09); *A63F 13/34* (2014.09); *A63F 13/352* (2014.09);
(Continued)

(58) Field of Classification Search
None
See application file for complete search history.

(56) References Cited

U.S. PATENT DOCUMENTS 5,923,324 A    7/1999    Berry et al.
6,238,291 B1   5/2001    Fujimoto
(Continued)

OTHER PUBLICATIONS

"Sweet Home 3D user's guide", Published on: May 18, 2010, 14 pages, Available at: http://www.sweethome3d.com/userGuide.jsp.
(Continued)

*Primary Examiner* — Xiao M Wu
*Assistant Examiner* — Steven Z Elbinger
(74) *Attorney, Agent, or Firm* — Newport IP, LLC; Scott Y. Shigeta

(57) ABSTRACT

The techniques disclosed herein enable a user of a host computer or a user of a remote computer to locate, view, control, and modify objects of a virtual environment. Embodiments disclosed herein can include the generation of a graphical user interface providing a two-dimensional display showing objects at a predetermined elevation of a three-dimensional virtual environment. User interface controls are provided for changing the elevation of the two-dimensional display. The two-dimensional display can be updated to show different elevations as the controls are used to select a new elevation. In some embodiments, the two-dimensional display enables users to move objects of a virtual reality environment. The display can bring highlight to select objects enabling users to readily locate desired objects and locations. The features disclosed herein can be utilized by a computer hosting a virtual reality session or a remote computer operating a companion application.

20 Claims, 15 Drawing Sheets

(51) Int. Cl.
  *A63F 13/63* (2014.01)
  *A63F 13/79* (2014.01)
  *G06F 3/16* (2006.01)
  *G06T 1/20* (2006.01)
  *G06T 19/00* (2011.01)
  *A63F 13/34* (2014.01)
  *A63F 13/352* (2014.01)

(52) U.S. Cl.
  CPC .......... *A63F 13/5378* (2014.09); *A63F 13/63* (2014.09); *A63F 13/79* (2014.09); *G06F 3/165* (2013.01); *G06T 1/20* (2013.01); *G06T 19/003* (2013.01); *G06T 19/006* (2013.01); *G10H 2210/026* (2013.01); *G10H 2210/375* (2013.01); *G10H 2210/381* (2013.01)

(56) References Cited

U.S. PATENT DOCUMENTS

| | | | |
|---|---|---|---|
| 7,357,719 | B2 | 4/2008 | Yamato |
| 8,012,023 | B2 | 9/2011 | Gates et al. |
| 8,591,326 | B2 | 11/2013 | Shuster |
| 8,875,026 | B2 * | 10/2014 | Hamilton, II ....... G06F 3/04847 715/703 |
| 8,922,590 | B1 * | 12/2014 | Luckett, Jr. ............ G09G 5/377 345/633 |
| 9,101,836 | B1 | 8/2015 | Brenden et al. |
| 9,122,321 | B2 | 9/2015 | Perez et al. |
| 9,159,152 | B1 * | 10/2015 | Glover .................... G06T 13/40 |
| 9,218,685 | B2 | 12/2015 | Piemonte et al. |
| 9,878,251 | B2 | 1/2018 | Hamilton, II |
| 2003/0063094 | A1 * | 4/2003 | Smith ............... G06F 17/30241 345/581 |
| 2004/0143852 | A1 | 7/2004 | Meyers |
| 2007/0011273 | A1 | 1/2007 | Greenstein et al. |
| 2007/0291034 | A1 * | 12/2007 | Dones ................... G06T 19/003 345/427 |
| 2009/0118016 | A1 | 5/2009 | Ben-Artzi et al. |
| 2009/0141905 | A1 | 6/2009 | Warhol |
| 2009/0177979 | A1 | 7/2009 | Garbow |
| 2010/0151431 | A1 | 6/2010 | Miller |
| 2011/0055733 | A1 | 3/2011 | Hamilton, II |
| 2011/0055919 | A1 | 3/2011 | Hamilton, II |
| 2011/0245942 | A1 * | 10/2011 | Yamamoto ............ A63F 13/803 700/91 |
| 2011/0302509 | A1 * | 12/2011 | Leacock ................ G06Q 10/10 715/756 |
| 2012/0266088 | A1 * | 10/2012 | Finn .......................... G06F 3/14 715/757 |
| 2014/0213371 | A1 | 7/2014 | Jain |
| 2014/0235326 | A1 | 8/2014 | Paracha et al. |
| 2015/0050997 | A1 | 2/2015 | Suzman |
| 2015/0278507 | A1 | 10/2015 | Moberg |
| 2015/0339094 | A1 * | 11/2015 | Rakshit ................. G06F 3/1454 345/2.2 |
| 2015/0378157 | A1 | 12/2015 | Kuehne et al. |
| 2016/0271498 | A1 | 9/2016 | Lifton et al. |
| 2016/0275722 | A1 * | 9/2016 | Bretschneider ....... G06T 19/006 |
| 2016/0284131 | A1 * | 9/2016 | Koga .................... G06T 19/006 |
| 2017/0018200 | A1 | 1/2017 | Nemire |
| 2017/0099280 | A1 | 4/2017 | Goel |
| 2017/0315697 | A1 * | 11/2017 | Jacobson ................ F24F 11/30 |

OTHER PUBLICATIONS

"Understanding and Configuring User Account Control in Windows Vista", Published on: Feb. 8, 2011, 36 pages, Available at: https://technet.microsoft.com/en-us/library/cc709628(v=ws.10).aspx.

U.S. Appl. No. 15/373,438—Non Final Office Action dated Feb. 23, 2018., 13 pages.

"Final Office Action Issued in U.S. Appl. No. 15/373,438", dated Jul. 11, 2018, 12 Pages.

* cited by examiner

NAVIGATION AND INTERACTION CONTROLS FOR THREE-DIMENSIONAL ENVIRONMENTS

CROSS REFERENCE TO RELATED APPLICATION

This patent application claims the benefit of U.S. Provisional Patent Application Ser. No. 62/345,623 filed Jun. 3, 2016, entitled "ADMINISTRATIVE CONTROL FEATURES FOR HOSTED GAME SESSIONS," which is hereby incorporated in its entirety by reference.

BACKGROUND

Virtual environments generally involve computer-generated, three-dimensional representations of a setting. The setting, for instance, can include a large landscape which may be as large as a city, building, or some other unit of space. The representations can include virtual reality objects, which can include avatars representing computer users and other representations of real-world or fictional items.

With the continuing increase in processor power and memory density and the continuing decrease in the cost of processors and displays, virtual environment systems can include a representation of very large settings, some of which can include underground caverns, a variety of elevations at ground level, and at many elevations above ground level. Some settings can cover great distances, some that may include representations of multiple cities.

Most virtual environments include more space than can be viewed from a single viewpoint. Thus, when using existing navigational user interface tools, which are often from a single viewpoint, a large virtual environment is only as useful as a user's ability to move around and interact with objects within that view. Such user interface tools can make it difficult for users to navigate through a virtual environment, let alone locate, manage, and otherwise interact objects within the virtual environment. In some scenarios, some existing user interface tools can make it difficult for users to locate other players. Such challenges are further complicated when virtual environments involve hundreds or thousands of users interacting with millions of objects.

SUMMARY

The techniques described herein provide navigation and interaction controls for three-dimensional environments. More specifically, the techniques disclosed herein enable a user of a host computer or a user of a remote computer to locate, view, control, and modify objects of a virtual environment. Some embodiments include a system that can generate a graphical user interface providing a two-dimensional display showing objects at a predetermined elevation of a three-dimensional virtual environment. User interface controls are provided for changing the elevation of the two-dimensional display. The two-dimensional display can be updated to show different elevations of the three-dimensional virtual environment in response to receiving a user input, such as an input caused by a user interaction with the user interface controls. In some embodiments, the two-dimensional display enables users to move objects of a virtual reality environment. For example, a display can highlight or otherwise augment select objects to help users readily locate and identify objects and locations. As will be described in more detail below, the features disclosed herein can be utilized by a computer hosting a virtual reality application or a remote computer operating a companion application.

In some embodiments, the navigation and interaction controls can be displayed on a host device operating an application for managing session data defining a three-dimensional virtual reality environment. In such embodiments, the host device can display a two-dimensional map using two dimensions (X, Y) of the three-dimensional virtual environment, wherein the display of the two-dimensional map is at an elevation level based on a third dimension (Z) of the three-dimensional virtual environment. A graphical user interface can include the display of an elevation graphical element, e.g., a control, for receiving an input for modifying the elevation level. When a user actuates the elevation graphical element to modify the elevation level, data defining a new elevation level is generated in response to receiving the input. The display of the two-dimensional map can be modified such that a new two-dimensional map at the new elevation level is displayed.

In some embodiments, session data can define attributes of a first user and attributes of a second user. For example, the session data can define coordinates for a viewing area of the second user, wherein the viewing area provides a first-person perspective view of content, e.g., objects of the virtual reality environment that are displayed to the second user. To move an object, such as the first user, a system can receive a set of coordinates defining a new position for the object. The system can determine when the new position intersects with the coordinates of the viewing area of the second user. When the new position intersects with the coordinates of the viewing area of the second user, the host application can generate a notification, such as bring highlight to object being moved, generate a sound, or otherwise change at least one viewing property of a graphical element of a user interface. A viewing property can include a color, a brightness level, a thickness of a line, etc. The user can confirm the move of the object to the new position, e.g., dragging and dropping the user or object by pressing, releasing, activating or deactivating an input device. Once the move is confirmed, the object can be placed in a position at or near the new position. In addition, a representation of the object being moved, such as the first user, can be rendered in the two-dimensional map and a corresponding three-dimensional map of the virtual environment.

In some embodiments, the navigation and interaction controls can be displayed on a remote computing device operating a companion application. In such embodiments, a method can include communicating session data defining aspects of a three-dimensional virtual environment from a host device to the remote computing device operating the companion application. The companion application can cause a display of a two-dimensional map using two dimensions (X, Y) of the three-dimensional virtual environment, wherein the display of the two-dimensional map is at an elevation level based on a third dimension (Z) of the three-dimensional virtual environment. A graphical user interface can include a display of an elevation graphical element for receiving an input for modifying the elevation level. When a user of the remote computing device actuates the elevation graphical element to modify the elevation level, data defining a new elevation level is generated in response to receiving the input. The display of the two-dimensional map can be modified such that a new two-dimensional map at the new elevation level is displayed.

The companion application can be used to move, e.g., teleport, users and other objects to a new location. With reference to the above-example involving the first user and the second user, the session data can be processed by the companion application to display a representation of a viewing area of the second user, wherein the viewing area provides a first-person perspective view of what the second user sees within the three-dimensional virtual reality environment. A method can include receiving a set of coordinates defining a new position for the first user or an object. The method can determine when the new position intersects with the coordinates of viewing area of the second user. When the new position intersects with the viewing area of the second user, the companion application can generate a notification, such as those summarized herein, to bring highlight to a representation of a user or an object being moved. The user can confirm the move of the first user or object to the position, e.g., dropping the user or object into a position using the inputs disclosed herein. In response to receiving the confirmation, update data indicating the move can be communicated from the companion application to the host application. The host application can then update session data stored at the host device based on the update data. In addition, a representation of the first user or a representation of the object being moved can be rendered in the two-dimensional map and a corresponding three-dimensional map of the virtual environment.

In a three-dimensional virtual environment, users can lose track of each other and other objects. To address this issue, among other benefits, the techniques disclosed herein enable a user, which may be a moderator or administrator, to locate and move an object to a new location. Such features enable other users to see each other, and see objects that may otherwise be difficult to locate and interact with. Among other technical benefits, the techniques disclosed herein improve human interaction with a computing device. Benefits which can reduce inadvertent inputs and reduce the use of computing cycles needed to complete a task.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
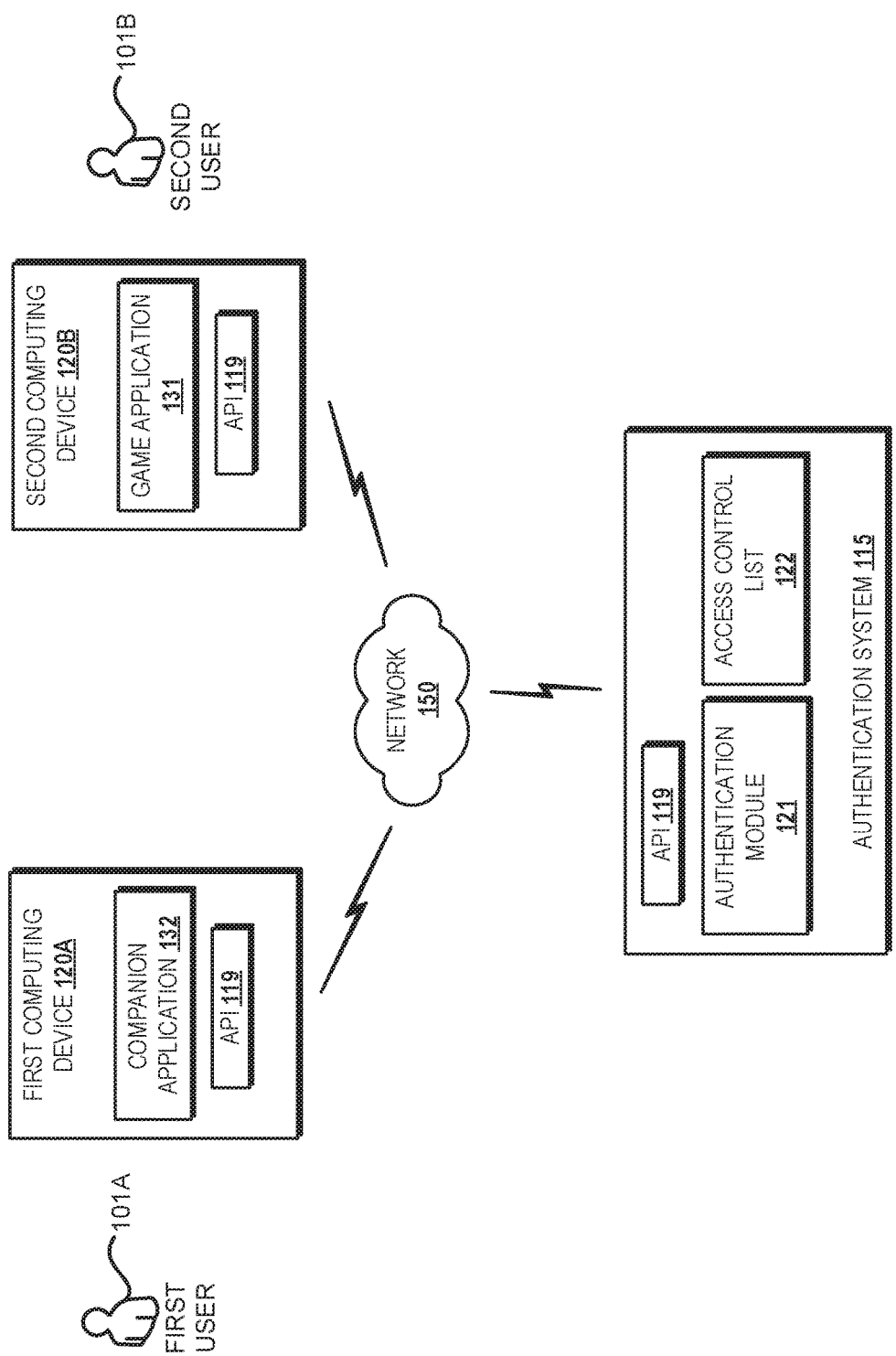
FIG. 1 illustrates aspects of a system for enabling administrative control features for hosted game sessions.

The techniques described herein provide navigation and interaction controls for three-dimensional environments. The techniques disclosed herein enable a user of a host computer or a user of a remote computer to locate, view, control, and modify objects of a virtual environment. Embodiments disclosed herein can include the generation of a graphical user interface providing a two-dimensional display showing objects at a predetermined elevation of a three-dimensional virtual environment. User interface controls are provided for changing the elevation of the two-dimensional display. The two-dimensional display can be updated to show different elevations as the controls are used to select a new elevation. In some embodiments, the two-dimensional display enables users to move objects of a virtual reality environment. The display can bring highlight to select objects enabling users to readily locate desired objects and locations. The features disclosed herein can be utilized by a computer hosting a virtual reality session or a remote computer operating a companion application.

In some embodiments, the navigation controls can be displayed on a host device operating an application for managing session data defining a three-dimensional virtual reality environment. In such embodiments, the host device can display a two-dimensional map using two dimensions (X, Y) of the three-dimensional virtual environment, wherein the display of the two-dimensional map is at an elevation level based on a third dimension (Z) of the three-dimensional virtual environment. A graphical user interface can include the display of an elevation graphical element, e.g., a control, for receiving an input for modifying the elevation level. When a user actuates the elevation graphical element to modify the elevation level, data defining a new elevation level is generated in response to receiving the input. The display of the two-dimensional map can be modified such that a new two-dimensional map at the new elevation level is displayed.

In some embodiments, session data, which may include game data of a game session, can define attributes of a first user and attributes of a second user. For example, the session data can define coordinates for a viewing area of the second user, wherein the viewing area provides a first-person perspective view of content, e.g., objects the second user sees within the three-dimensional virtual reality environment. A system can receive a set of coordinates defining a new position for the first user or an object. The system can determine when the new position intersects with the coordinates of the viewing area of the second user. When the new position intersects with the coordinates of the viewing area of the second user, the host application can generate a notification, such as bring highlight to the user or object being moved, generate a sound, or otherwise change at least one viewing property of a graphical element of a user interface. A viewing property can include a color, brightness, thickness of an outline, etc. The user can confirm the move of the first user or object to the position, e.g., dropping the user or object by pressing, releasing, activating or deactivating an input device. Once the move is confirmed, the first user or the object can be placed in a position at or near the new position. In addition, a representation of the first user or a representation of the object can be rendered in the two-dimensional map and a corresponding three-dimensional map of the virtual environment.

In some embodiments, the navigation controls can be displayed on a remote computing device operating a companion application. In such embodiments, a method can include communicating session data defining aspects of a three-dimensional virtual environment from a host application to a companion application. The companion application can cause a display of a two-dimensional map using two dimensions (X, Y) of the three-dimensional virtual environment, wherein the display of the two-dimensional map is at an elevation level based, at least in part, on a third dimension (Z) of the three-dimensional virtual environment. A graphical user interface can include a display of an elevation graphical element for receiving an input for modifying the elevation level. When a user of the remote computing device actuates the elevation graphical element to modify the elevation level, data defining a new elevation level is generated in response to receiving the input. The display of the two-dimensional map can be modified such that a new two-dimensional map at the new elevation level is displayed.

The companion application can be used to move, e.g., teleport, users and other objects to a new location. With reference to the above-example involving the first user and the second user, the session data can be processed by the companion application to display a representation of a viewing area of the second user, wherein the viewing area provides a first-person perspective view of what the second user sees within the three-dimensional virtual reality environment. A method can include receiving a set of coordinates defining a new position for the first user or an object. The method can determine when the new position intersects with the coordinates of viewing area of the second user. When the new position intersects with the viewing area of the second user, the companion application can generate a notification, such as those summarized herein, to bring highlight to a representation of a user or an object being moved. The user can confirm the move of the first user or object to the position, e.g., dropping the user or object into a position using the inputs disclosed herein. In response to receiving the confirmation, update data indicating the move can be communicated from the companion application to the host application. The host application can then update session data stored at the host device based on the update data. In addition, a representation of the first user or a representation of the object being moved can be rendered in the two-dimensional map and a corresponding three-dimensional map of the virtual environment.

As summarized above, embodiments provided herein enable users of a host computer or a user of a remote computer to locate, view, control, and modify objects of a virtual environment. To facilitate such embodiments, FIG. 1 illustrates aspects of a system comprising a remote computer, e.g., a first computing device 102A, operating a companion application 132 and a host device, e.g., a second computing device 102B, operating a host application (also referred to herein as a "game application 131").

Referring now to FIG. 1, aspects of a system 100 for enabling navigation and interaction controls for three-dimensional environments are shown and described below. It should be appreciated that the subject matter described herein can be implemented as a computer-controlled apparatus, a computer process, a computing system, or as an article of manufacture such as a computer-readable storage medium. These and various other features will be apparent from a reading of the following Detailed Description and a review of the associated drawings. Furthermore, the claimed subject matter is not limited to implementations that solve any or all disadvantages noted in any part of this disclosure.

As will be described in more detail herein, it can be appreciated that implementations of the techniques and technologies described herein may include the use of solid state circuits, digital logic circuits, computer component, and/or software executing on one or more devices. Signals described herein may include analog and/or digital signals for communicating a changed state, movement and/or any data associated with motion detection. Gestures, e.g., which can be in the form of any type of movement, captured by users of the computing devices can use any type of sensor or input device.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

By the use of the technologies described herein, administrative control over one or more hosted game sessions can be obtained by one or more identities associated with appropriate credentials. For instance, if a number of students in a class are running a multiplayer game, a teacher can receive, modify, and control game data in runtime. Such technologies can improve user interaction with a computing device by providing an interface to obtain game data, and by enabling an enterprise system to control access to such game data. Configurations disclosed herein can be beneficial in assisting users and business entities by controlling access to secured sessions. Among many benefits provided by the technologies described herein, a user's interaction with a device may be improved, which may reduce the number of inadvertent inputs, reduce the consumption of processing resources, increase security, and mitigate the use of network resources. Other technical effects other than those mentioned herein can also be realized from implementations of the technologies disclosed herein.

In the following description, references are made to the accompanying drawings that form a part hereof, and in which are shown by way of illustration specific configurations or examples. Referring to the system drawings, in which like numerals represent like elements throughout the several figures, aspects of a computing system, computer-readable storage medium, and computer-implemented methodologies for administrative control features for hosted game sessions.

FIG. 1 is a block diagram showing aspects of one example system 100 disclosed herein for enabling administrative control features for hosted game sessions. In one illustrative example, the example environment 100 can include an authentication system 115 and one or more computing devices 120A-120B ("devices 120"), and one or more networks 150. As will be described below, a companion application 132 running on the first computing device 120A can obtain administrative control of a game application 131 (also referred to herein as a "host application" of a three-dimensional environment) running on the second computing device 120B. Access to the administrative control can be administered by the authentication system 115. This example system 100 is provided for illustrative purposes and is not to be construed as limiting. It can be appreciated that the system 100 can include any number of devices, users, access systems, and/or any number of authentication systems.

The authentication system 115 and the devices 120 and/or any other computer configured with the features disclosed herein can be interconnected through one or more local and/or wide area networks, such as the network 150. In addition, the computing devices can communicate using any technology, such as BLUETOOTH, WIFI, WIFI DIRECT, NFC or any other suitable technology, which may include light-based, wired, or wireless technologies. It should be appreciated that many more types of connections may be utilized than described herein.

Individual devices 120 can operate as a stand-alone device, or such devices can operate in conjunction with other computers, such as the one or more servers. Individual computing devices can be in the form of a personal computer, mobile phone, tablet, wearable computer, including a head-mounted display (HMD), or any other computing device having components for interacting with one or more users 101. In one illustrative example, a device 120 can include a local memory (FIG. 8), also referred to herein as a "computer-readable storage medium," configured to store data and code modules, such as a game application 131 and a companion application 132.

The authentication system 115 can be in the form of a personal computer, a server farm, a large-scale system or any other computing system having components for processing, coordinating, collecting, storing, and/or communicating data between one or more computing devices. The authentication system 115 can also include a service provided by a third-party entity. In one illustrative example, the authentication system 115 can include a local memory (FIG. 8), also referred to herein as a "computer-readable storage medium," configured to store data and code modules, such as the authentication module 121 and access control list 122.

The authentication system 115 can operate one or more authentication services, such as MICROSOFT'S ACTIVE DIRECTORY or any other service operating an authentication protocol, such as OpenID, can be utilized to manage credentials and generate permission data for use by the access system. Credentials can be received at the authentication module 121 from one or more devices 120, and the authentication system 115 can generate permission data for enabling the one or more devices 120 to allow another computer program, such as the companion application 132, to override administrative control of another application, such as the game application 131.

In some configurations, the devices 120 and the authentication system 115 can comprise an application programming interface 119 ("API 119") exposing a communication interface through which an operating system and application programs executing on the computing devices can enable the functionality disclosed herein. Through the use of this data interface and other interfaces, the operating system and application programs can communicate and process resource data and other data.

Figure 2A:
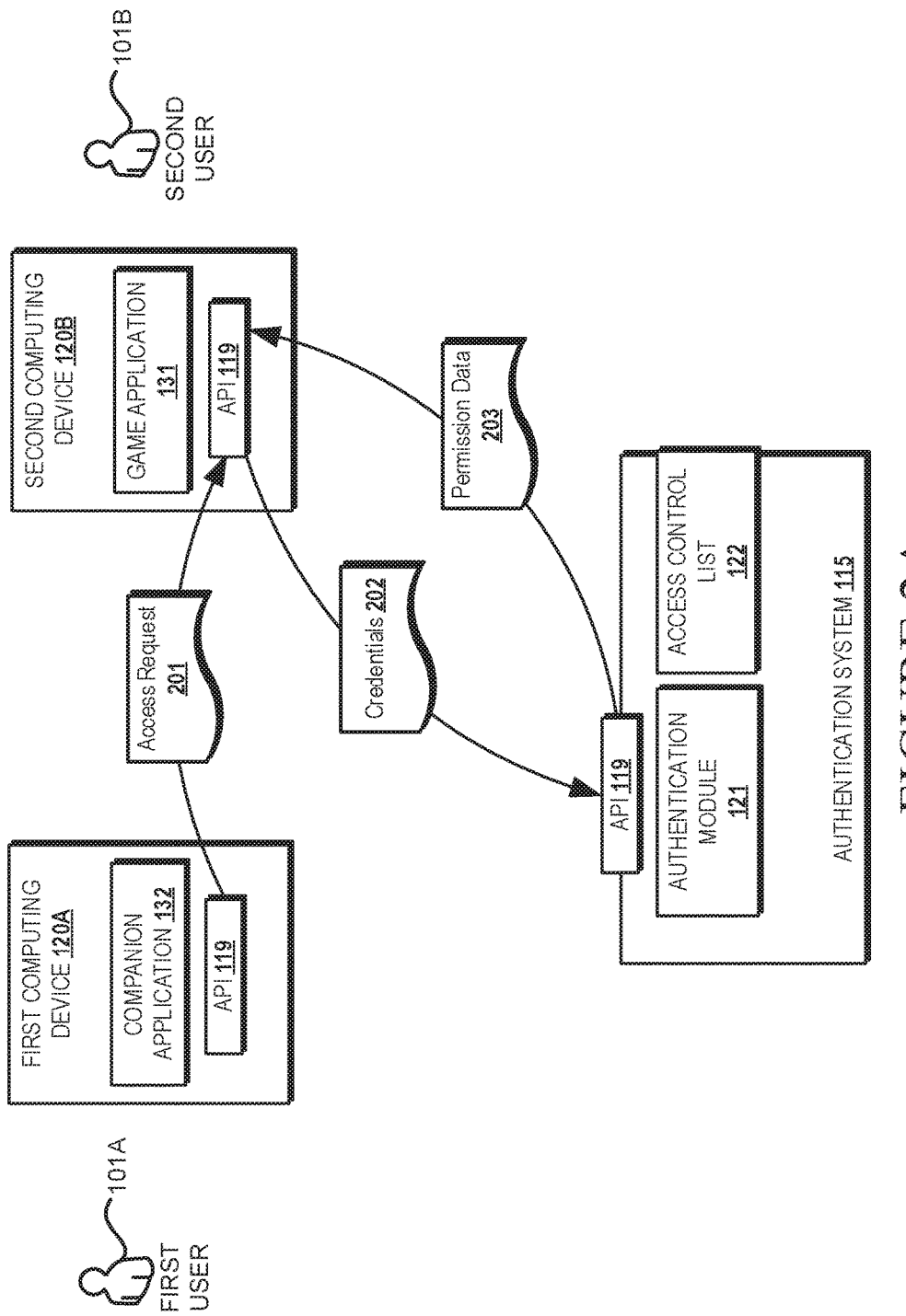
FIGS. 2A-2B illustrates aspects of an example data flow scenario involving the system depicted in FIG. 1.
Figure 2B:
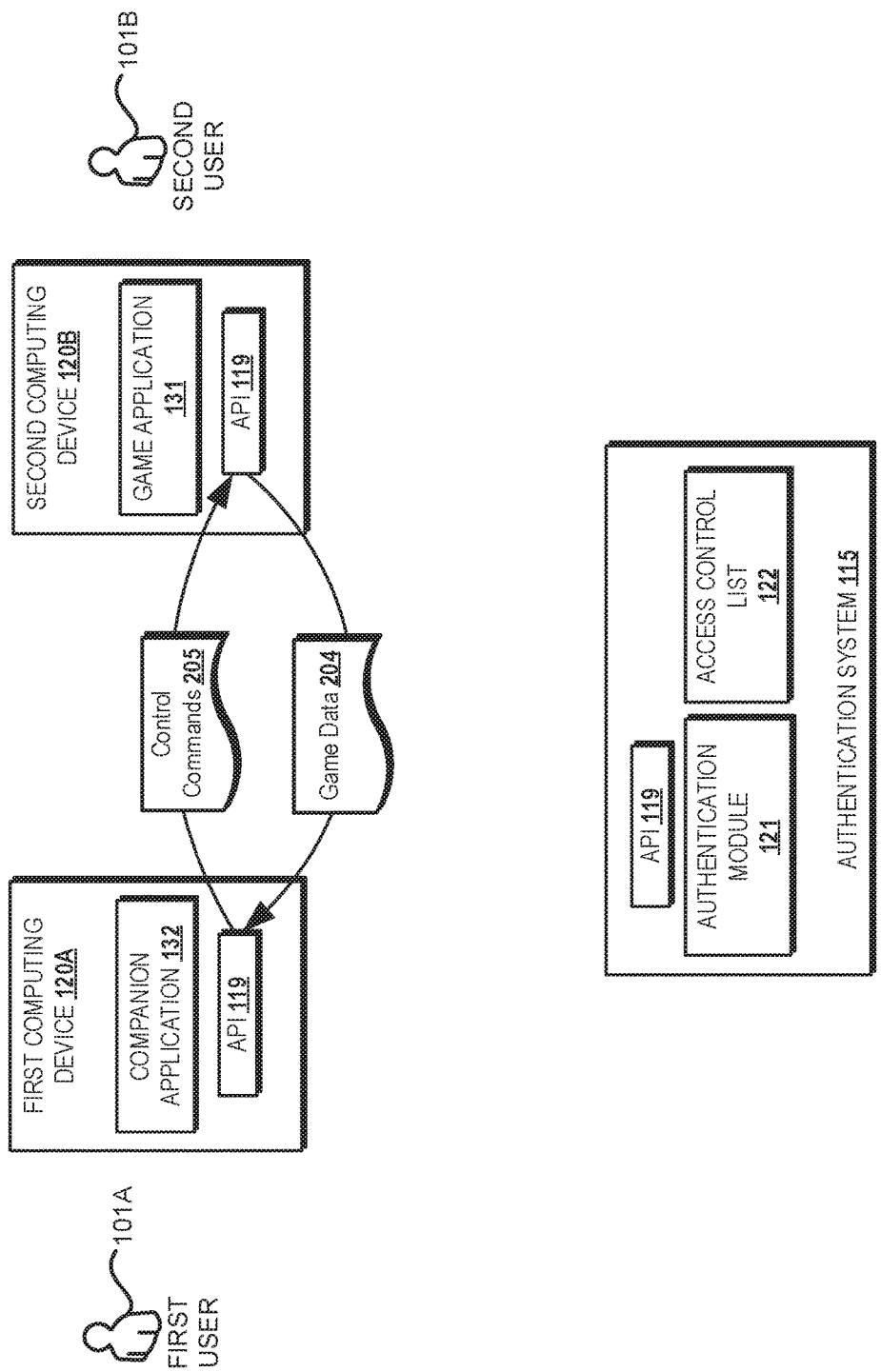

Referring now to FIGS. 2A-2B, an example data flow scenario involving the system 100 is shown and described. In this example, the game application 131 is hosting a multi-player game, and the second user 101B has administrative control over a game session. In this example, the first user 101A is associated with credentials 202 having permissions for overriding the administrative control of the second user 101B. To initiate control of the game session, the first user 101A interacts with the companion application 132 to send an access request 201 to the game application 131. The access request 201 can include credentials associated with the first user 101A.

The game application 131 can then verify the credentials 201 for overriding the administrative controls of the second user 101B. In some configurations, the verification of the credentials can involve sending the credentials to the authentication system 115, which in this example includes one or more servers running a directory service, such as MICROSOFT'S ACTIVE DIRECTORY or any other service operating an authentication protocol, such as OpenID.

The authentication module 121 can verify the credentials 201 associated with the first user 101A. In some configurations, the authentication module 121 can utilize an access control list 122 to verify one or more credentials. In this example, the first user 101A is a teacher and the second user 101B is a student. In such a scenario, the access control list 122 can associate credentials of the users with one or more roles. In a teacher-student scenario, the access control list 122 can enable teachers to have credentials for overriding administrative control over computing devices and processes administered by a student. This example is provided for illustrative purposes and is not to be construed as limiting. It can be appreciated that any hierarchy of users can be established to associate credentials 202 enabling one set of users to override administrative control over another set of users. It can also be appreciated that the credentials 202 associated with the first user 101A can also be communicated directly from the first computing device 120A to the authentication system 115. In turn, the authentication system 115 can communicate the permission data 203 to the second computing device 120B for verification.

In response to verifying the credentials 201, the authentication system 115 sends permission data 203 back to the game application 131 to enable the first user 101A to override the administrative controls of the game application 131. In this example, the first user 101A obtains administrative control over aspects of the game application 131 including, but not limited to, control over aspects of a game session.

As shown in FIG. 2B, in response to verifying the credentials 202 of the first user 101A, the game application 131 enables the communication of the game data 204 defining activity of a game session to the companion application 132. In addition, in response to verifying the credentials 202 of the first user 101A, the game application 131 can accept and process control commands 205 received from the companion application 132. The control commands 205, such as an update for session data, can control aspects of the game application 131. As will be described below, the exchange of game data 204 and control commands 205 enables the companion application 132 to view aspects of a game session, control aspects of a game session, and modify attributes of any type of game data.

In some configurations, modification of the attributes of the game data can include, but is not limited to, changing parameters defining the shape of a three-dimensional virtual environment. For example, this can include the size and dimensions of a virtual map. Among many other examples, the modification of the attributes of the game data can include, but is not limited to, modifying assets of a player in a game session, wherein a modification can include removing the asset of the player, adding an asset of the player, or changing an asset type. In a game, a player could have spells or special powers, such features can be added, removed, or otherwise modified. The modification of the attributes of the game data can include adding blocks, setting blocks, or changing a block type. Also, players or groups of players can be added or removed. The modification of the attributes can also include adding blocks, setting blocks, or changing a block type. Also, players or groups of players can be added or removed. For illustrative purposes, a block can comprise a discrete component of a game environment. For instance, a block, some of which are part of a building structure in FIG. 5A, can define a section of a structure. As shown in that example, a first block 591A can be a first section of a roof, and a second block 591B can be a second section of the roof. Each block 591 can have a block type, each having properties and/or attributes. Examples of some block types can include steel, iron, wood, etc. Attribute and properties of each block type can emulate attribute and properties of real-world elements and compounds. For example, a steel block type can have a higher density and strength than a wood block type.

In addition, audio-based communication and/or text-based communication between players of a game can be communicated to the companion application 132. In some configurations, the companion application 132 can issue commands for controlling the communication between the players. The communication between the players, for example, can be muted, modified, filtered, and terminated by controls issued by the companion application 132.

Figure 3:
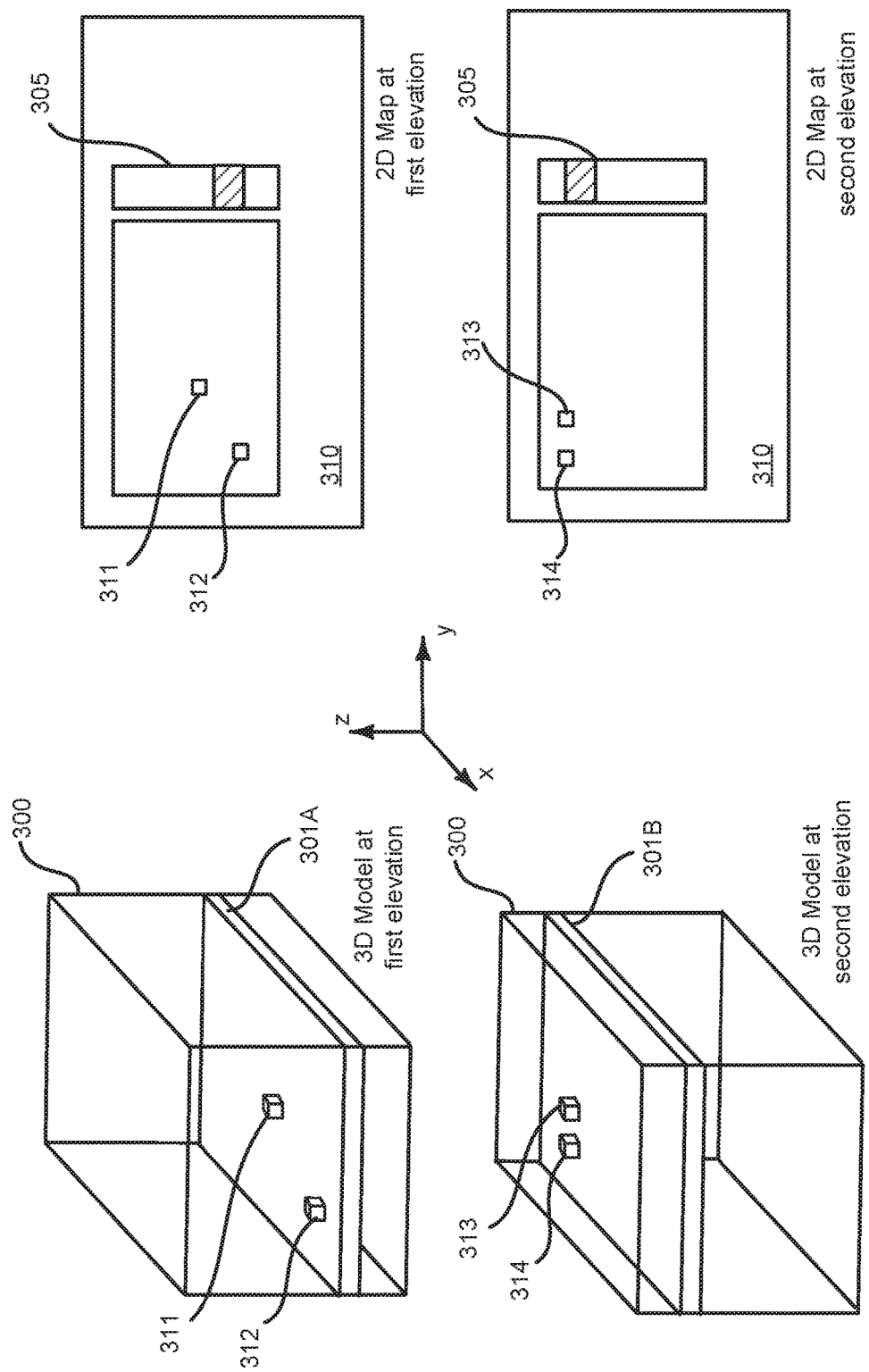
FIG. 3 illustrates a three-dimensional representation a three-dimensional virtual environment.

Among other features, the techniques disclosed herein can also include graphical tools for enabling a two-dimensional display of a three-dimensional virtual environment. One example feature is shown in FIG. 3. In this example, it is a given that the game data 204 (also referred to herein as "session data") defines aspects of a three-dimensional virtual environment. FIG. 3 illustrates a three-dimensional representation 300 of such a three-dimensional virtual environment.

Also shown in FIG. 3, an application, such as the companion application 132, can generate a user interface 310 for displaying a two-dimensional map from the game data 204. In this example, the display of the two-dimensional map uses two dimensions (X, Y) of the three-dimensional virtual environment, wherein the map is at an elevation level based, at least in part, on a third dimension (Z) of the three-dimensional virtual environment. In this example, the map data includes two objects 311 and 312 at a first elevation 301A, and two other objects 313 and 314 at a second elevation 301B.

As shown in the top right corner of FIG. 3, a user interface 310 displays a 2D map of the three-dimensional virtual environment at a first elevation. In addition, the bottom right corner of FIG. 3 shows a user interface 310 displaying a 2D map of the three-dimensional virtual environment at a second elevation. Each view at a selected elevation can display a predetermined number of levels, blocks, or other units of a three-dimensional virtual environment. For instance, when the three-dimensional virtual environment comprises blocks, a 2D map (X, Y) at a particular elevation can show objects (avatars of users or other items) within a range of blocks in vertical (Z) direction. Thus, when two objects are within a range of blocks of one another, e.g., one object that is ten blocks higher than another object, the 2D map can display both objects. In some embodiments, a 2D map can display objects having a preselected block type, e.g., avatars or items having certain attributes, that are within a threshold elevation from the selected elevation.

Also shown in FIG. 3, the user interface 310 includes an elevation graphical element 305 for receiving an input for modifying the elevation level. When a user actuates an elevation graphical element 305 to modify the elevation level, data defining a new elevation level is generated in response to receiving the input. The display of the two-dimensional map (upper right corner) can be modified such that a new two-dimensional map (lower right corner) at the new elevation level is displayed. Such a rendering tool enables a user to view a two-dimensional map and easily navigate to different elevations of the three-dimensional virtual environment. Such tool can be utilized for finding objects, moving objects, placing objects, and/or modifying aspects of a three-dimensional virtual environment.

Among other features, the techniques disclosed herein can enable a user, such as a user of the companion application 132, to teleport players and other objects to a new location. In a three-dimensional virtual environment, players can lose track of each other and other objects. By the techniques disclosed herein, a moderator can move a player to a location that enables players to see each other, or move an object so a player can see the object.

Figure 4A:
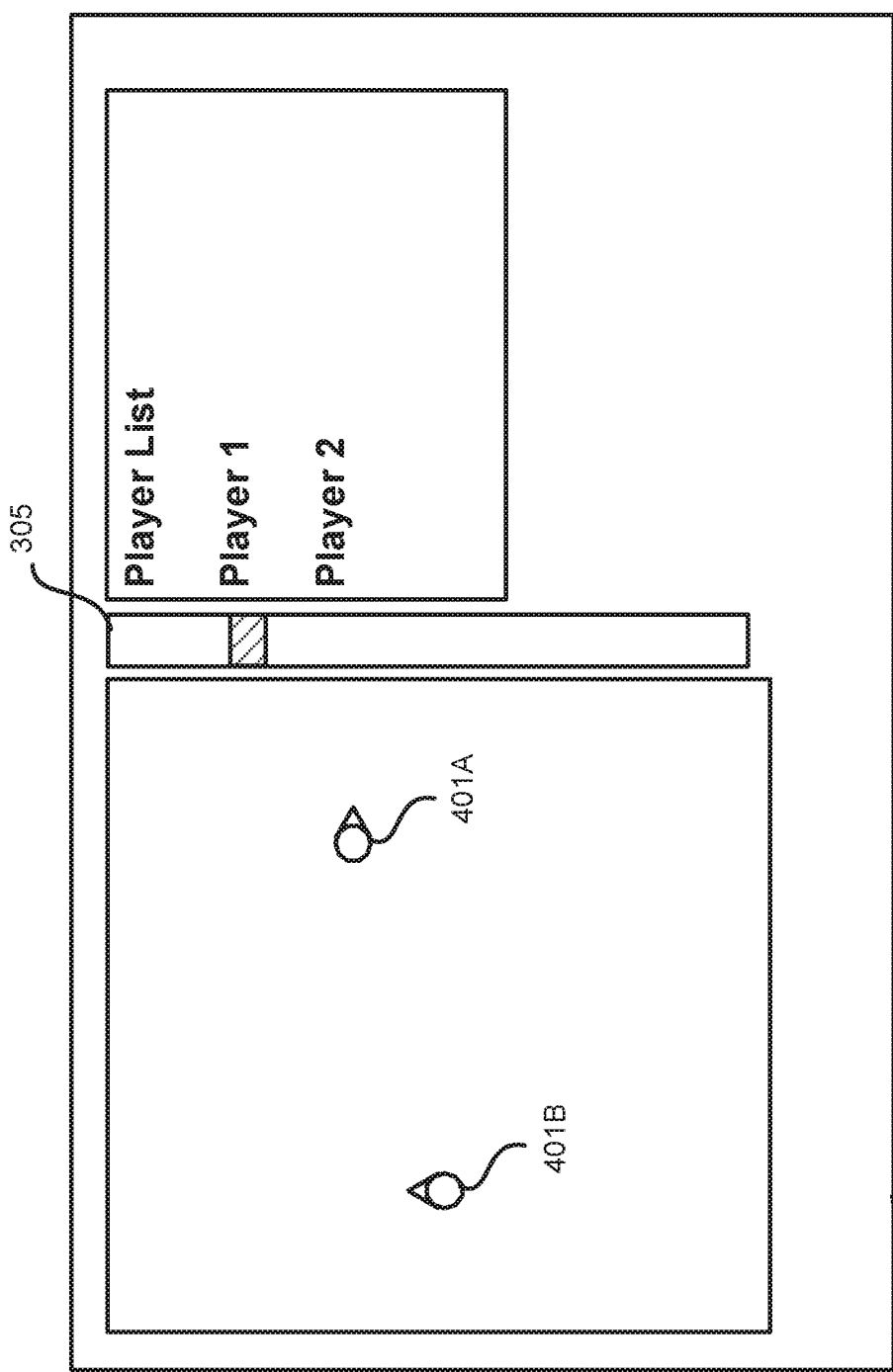
FIGS. 4A-4D show an example of a first player and a second player displayed on a two-dimensional map and a three-dimensional map.
Figure 4B:
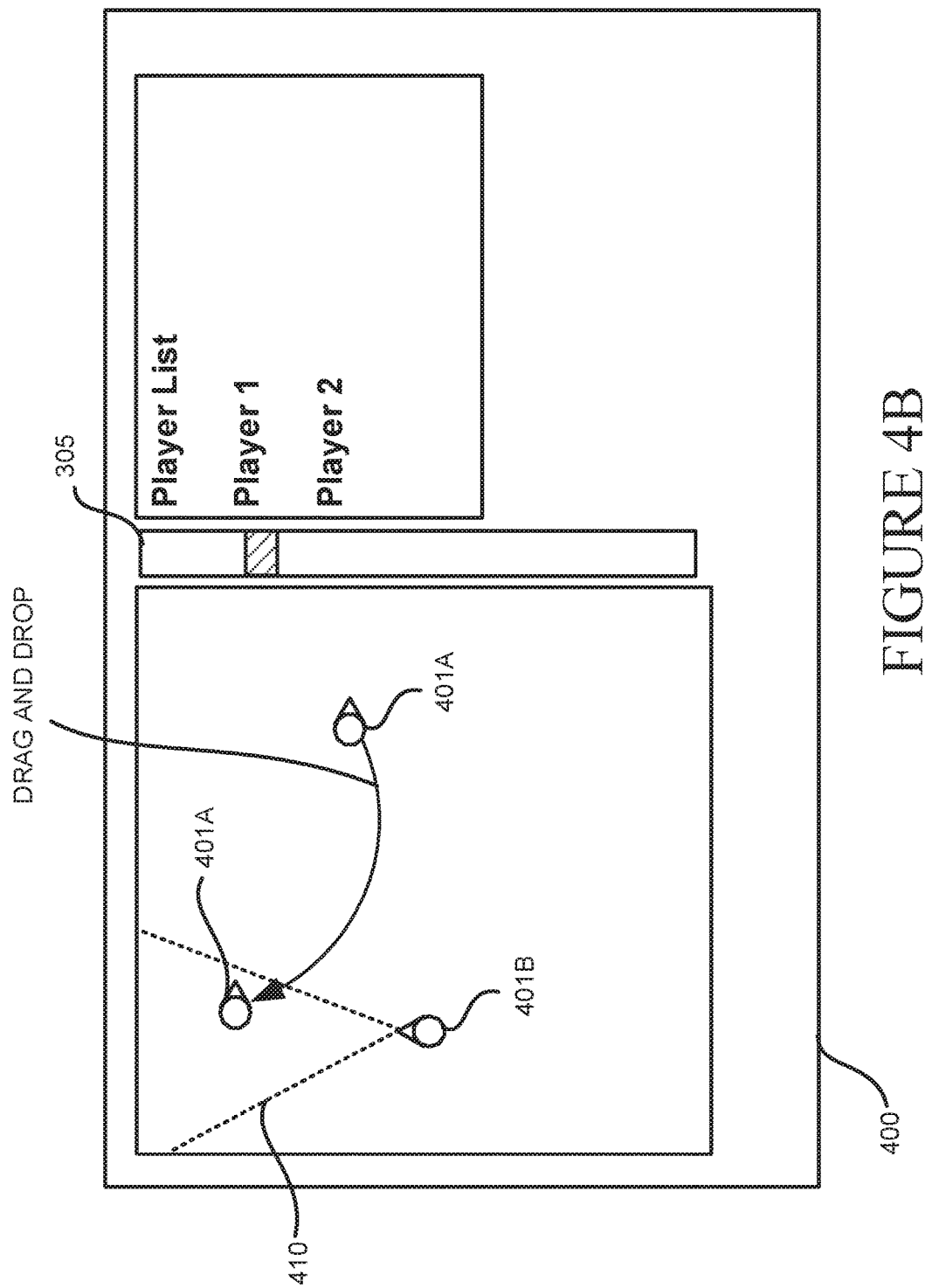

Referring to FIGS. 4A-4B, an example user interface 400 for teleporting objects is shown and described below. In this example, game data of a game session defines a first player 401A and a second player 401B. FIG. 4A shows the first player 401A and the second player 401B displayed on a two-dimensional map in this example, the user interface 400 also comprises an elevation graphical element 305. In this example, the object being moved is the second player 401B.

One or more software modules and the user interface 400 enables a user to drag and drop objects on the map. In some configurations, a user may select an object, such as the first player 401A, by selecting the object with the pointing device, such as a mouse or touchscreen. Once selected, the user can drag the selected object to a new location, as shown in FIG. 4B.

Figure 4C:
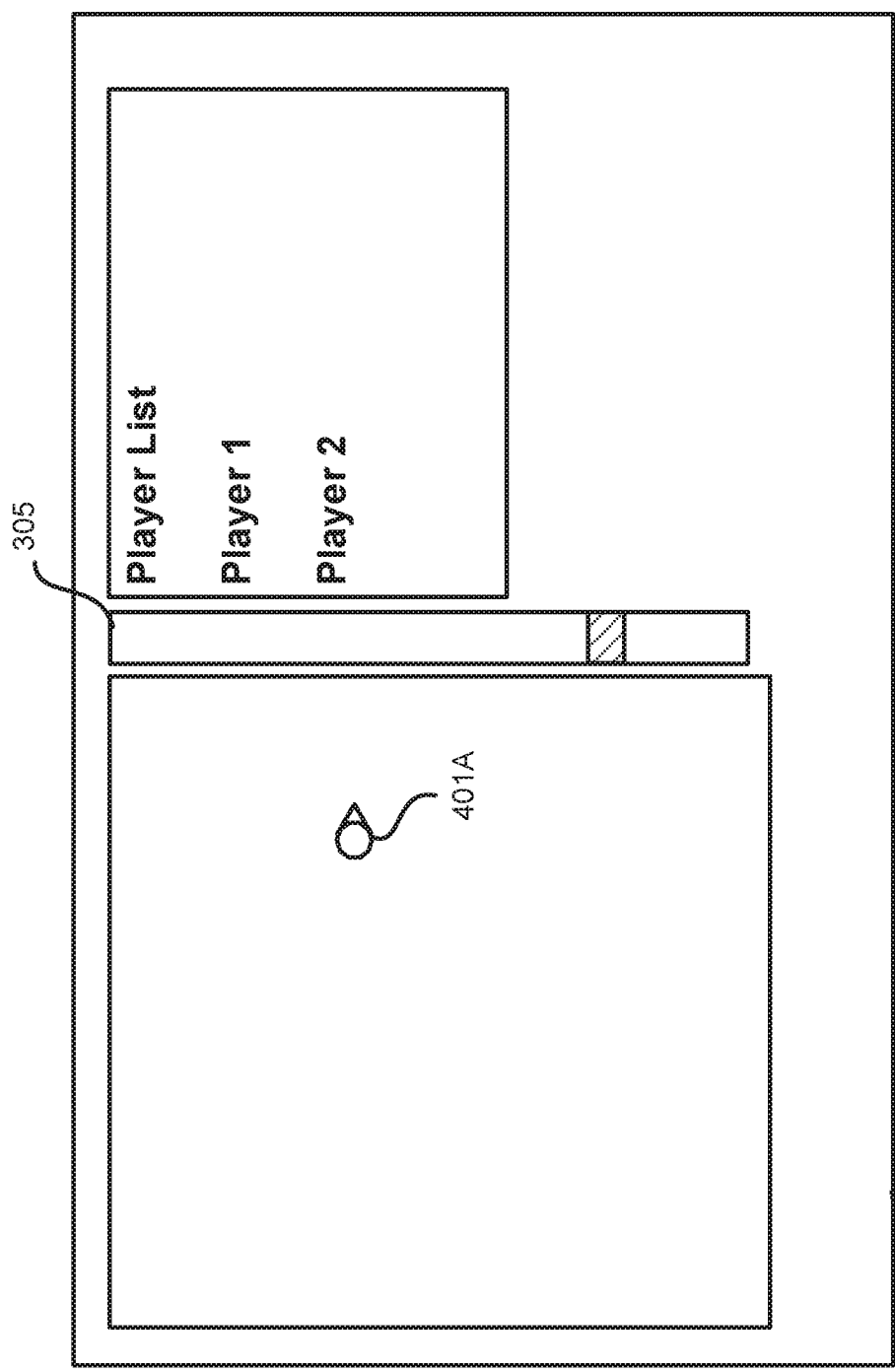

In some scenarios, the virtual reality object that is selected for movement can originate at a first elevation and be moved to a second elevation. For instance, with reference to FIG. 4C, the first player 401A is located at a first elevation, and in such a scenario, the system can display the first player 401A, or any other selected virtual reality object, in the first two-dimensional map at the first elevation. Then as the user scrolls through the elevations, the display of the first player 401A can be maintained. The system can augment the display of the object being moved, e.g., the first player 401A, which may be highlighted or shadowed.

Figure 4D:
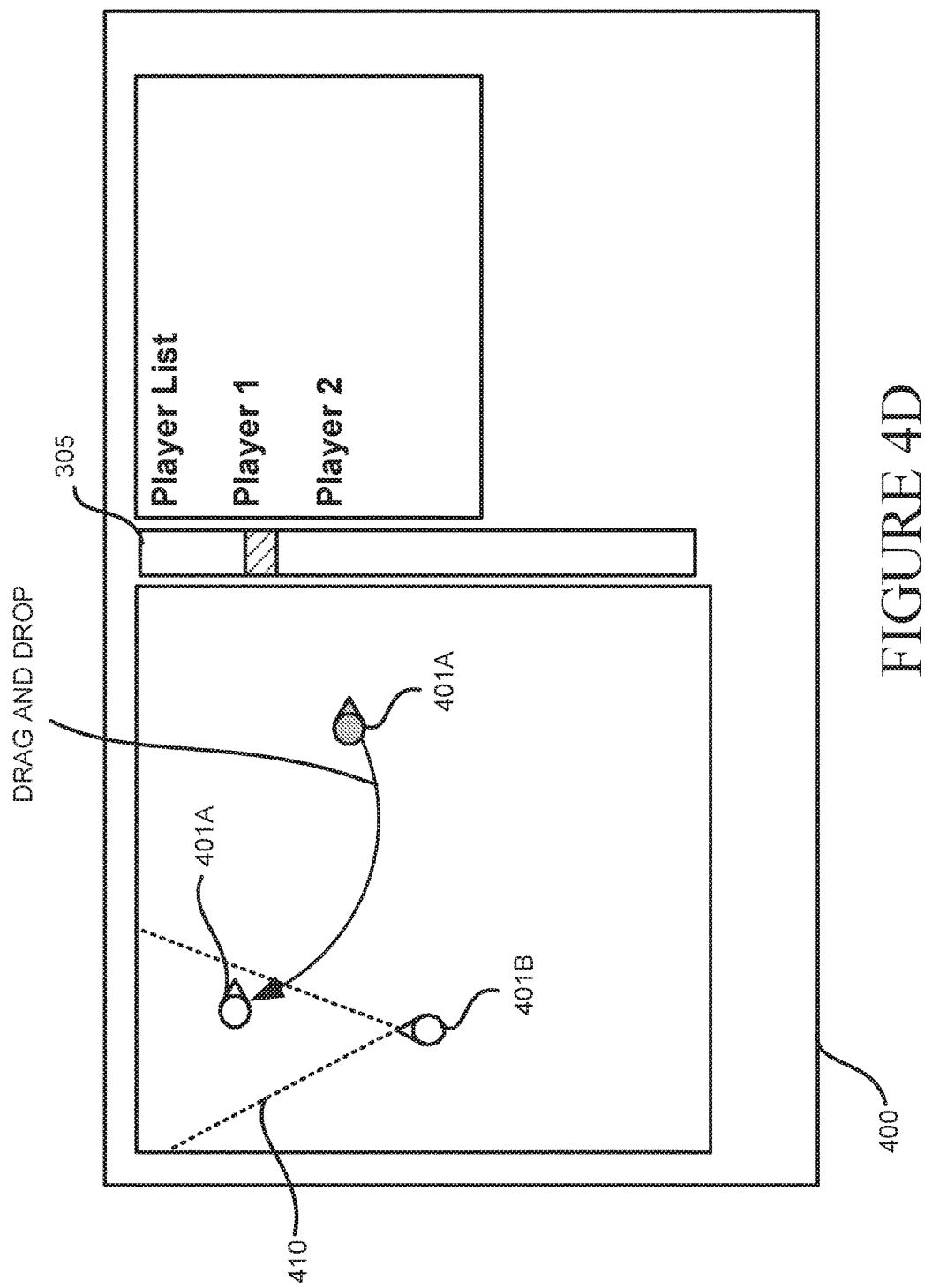

The augmented display of the object can be maintained as the user scrolls through different elevations. As shown in FIG. 4D, at a new elevation, the second player 401B and a viewing area 410 of the second player 401B is shown. FIG. 4D also shows an augmented display (highlighted, shadowed, etc.) of the first player 401A.

In accordance with the techniques disclosed herein, when a user moves a selected object, such as the first player 401A, to a new position, the companion application 132, the game application 131, or another module, can receive a set of coordinates defining the new position. In response to receiving a set of coordinates defining a new position, configurations disclosed herein can determine when the new position intersects with the viewing area 410 of the second player 401B. When the new position intersects with the viewing area of the second player 401B, the system can generate a notification, such as bring highlight to the moved object, generate a sound, bring highlight to the second player, and/or otherwise change at least one graphical element of a user interface. The user can confirm the move of the first player 402A, e.g., drop the player or object, by pressing or releasing a button or providing any other suitable form of input. Once the move is confirmed, the first player 402A or the object can be placed in a position at or near the new position.

Figure 5A:
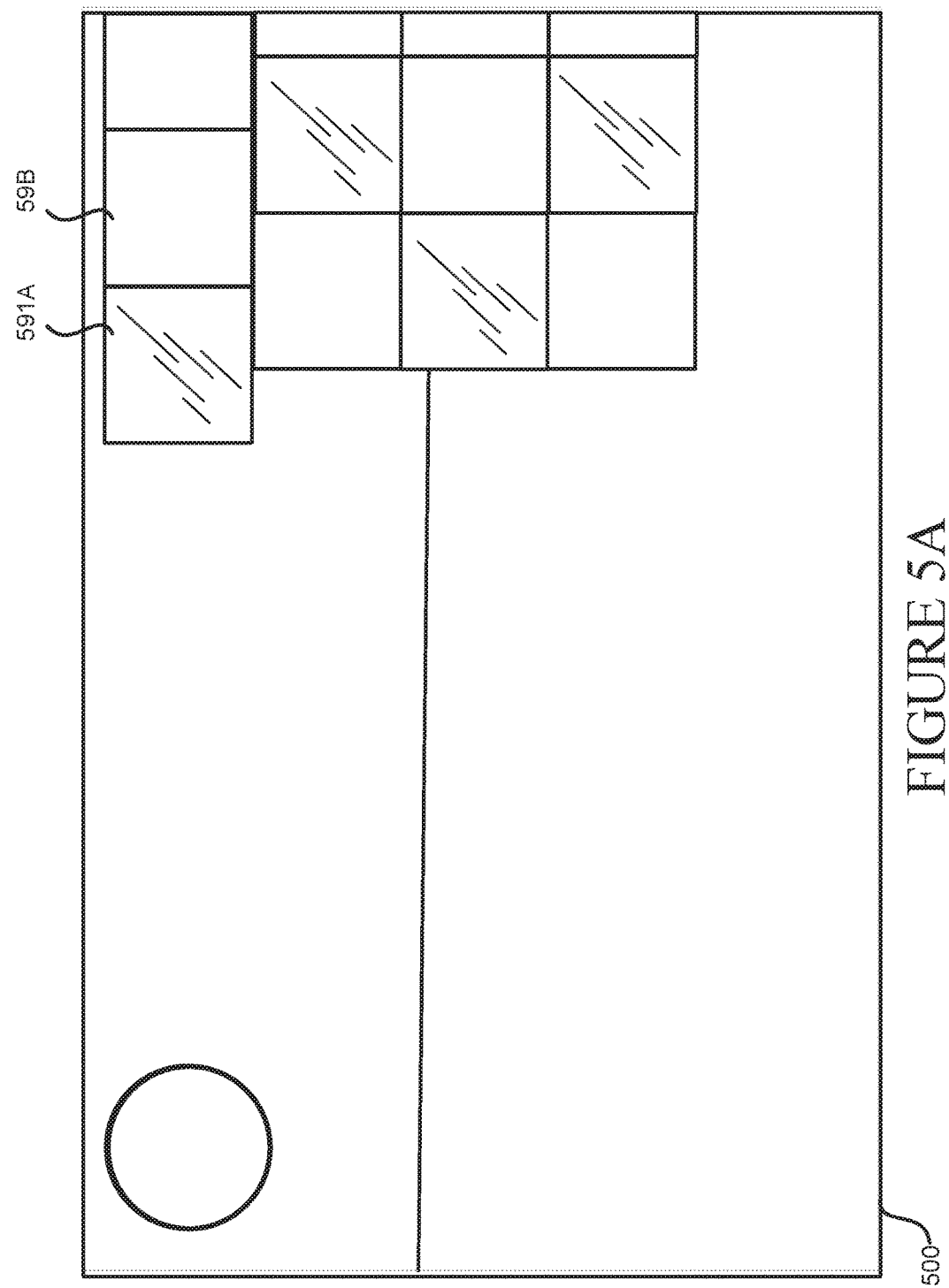
FIGS. 5A-5D show an example of a first-person view of a player being teleported.
Figure 5B:
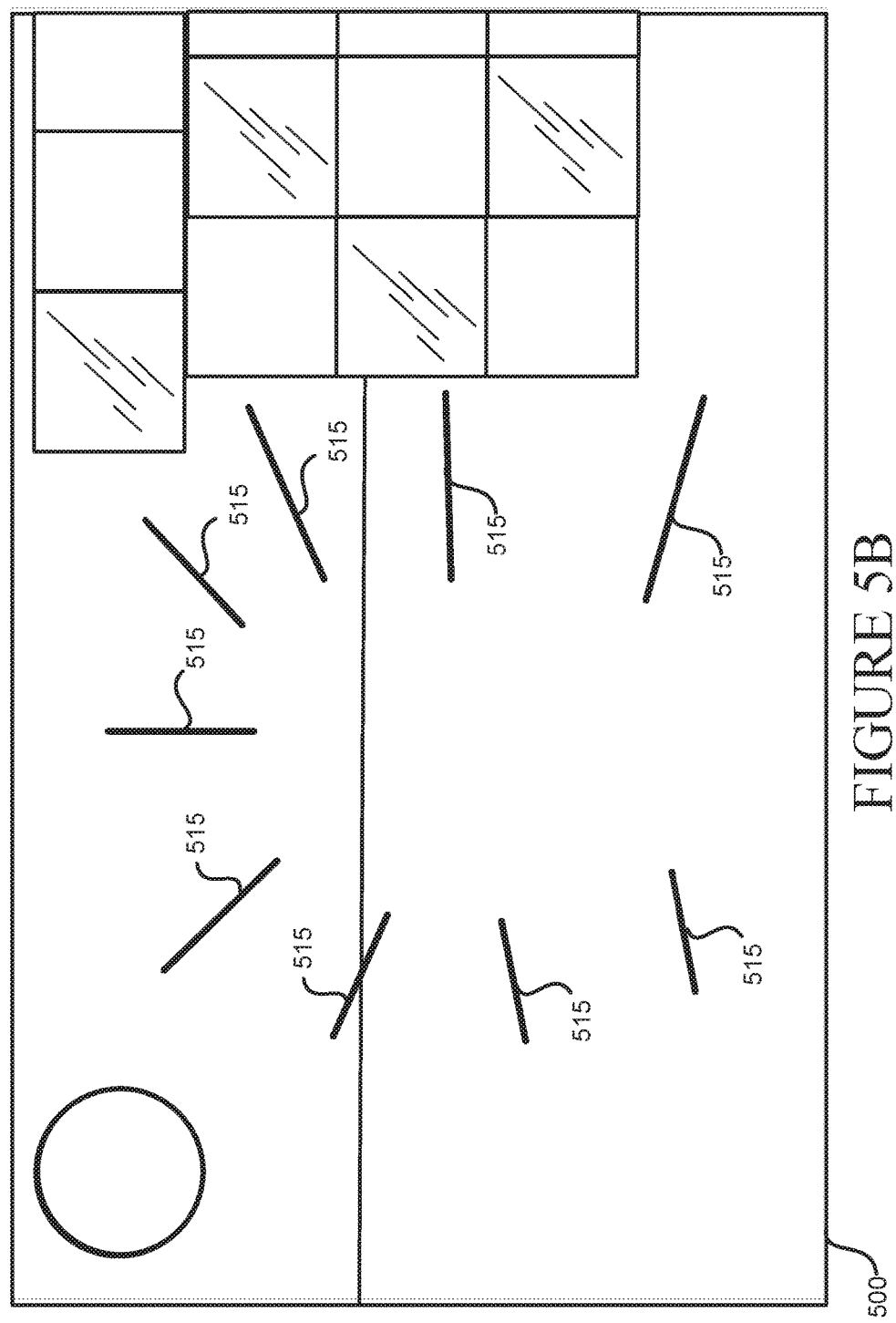
Figure 5C:
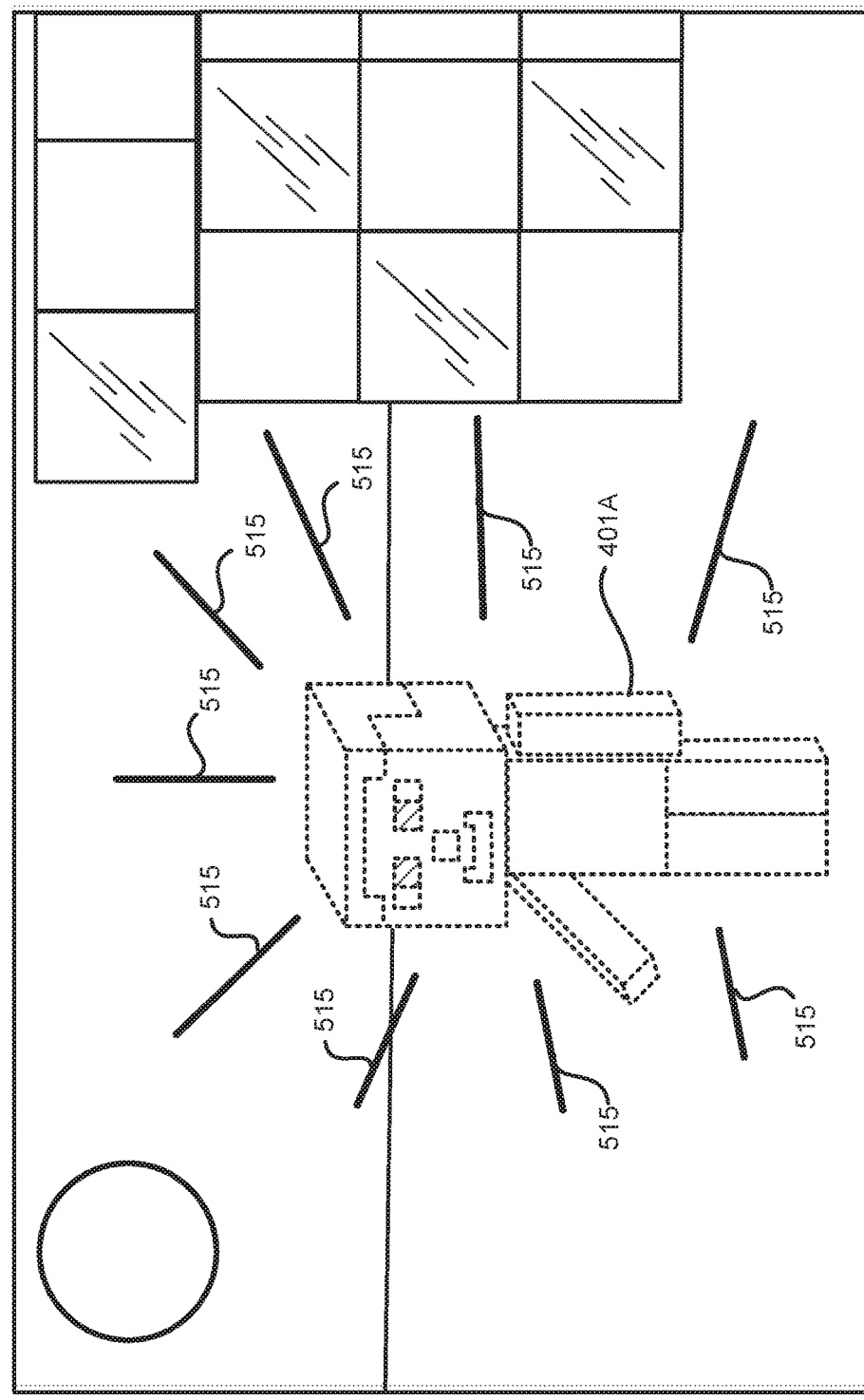
Figure 5D:
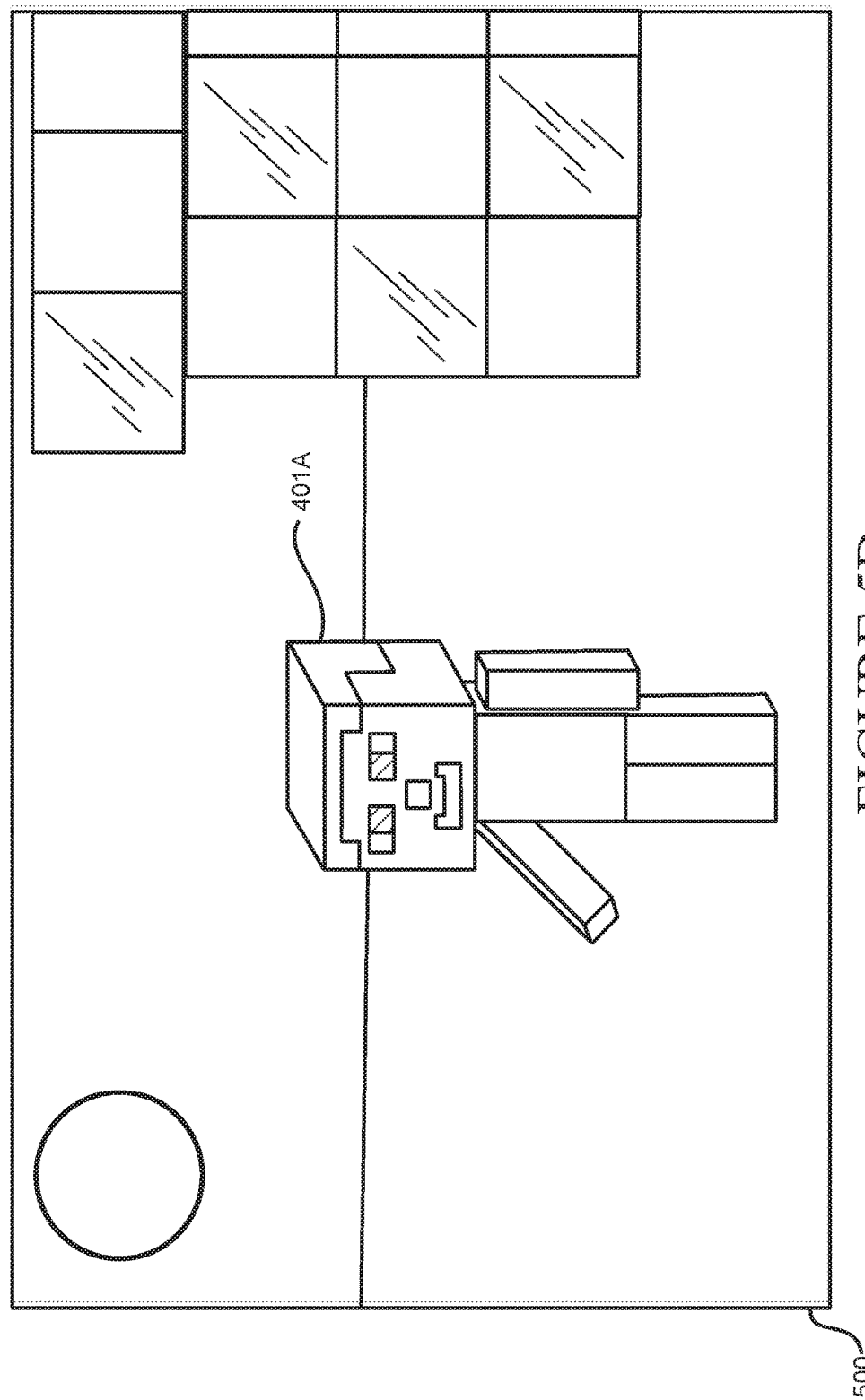

FIGS. 5A-5D illustrate examples of a notification for a teleported object. With reference to the above example, FIG. 5A shows a first-person view of the second player 401B in a user interface 500. In this example, the first player 401A is in the process of being teleported to a position within the view of the second player 401B. Just before the first player 401A is teleported, as shown in FIG. 5B, one or more graphical elements 515 can be displayed to indicate that an object is being teleported to a particular position. In addition, as shown in FIG. 5C, a flashing silhouette or another modified representation of the teleported object, such as the first player 401A, can be displayed on the user interface 500. The flashing silhouette or other modified representation of the teleported object can be shown in conjunction with the one or more graphical elements 515, or such features can be independently displayed. In addition, one or more audio signals can be generated to provide notice to a user, such as the second player 401B, that an object is in the process of being teleported to a selected location. As shown in FIG. 5D, after the notification, the teleported object can be fully displayed within the view of a player, such as the second player 401B.

Among other features of the system 100, in some configurations, the companion application 132 or the game application 131 can establish homing beacons for the players of a game session. The homing beacons can be audio-based and/or graphically-based. In one example, aspects of which are shown in the user interface of FIG. 8, a method can include receiving data indicating a selection of at least one set of coordinates defining a position within a three-dimensional virtual environment. The selection of the coordinates can be achieved in a number of ways. In one embodiment, a user can scroll through a number of elevations, as shown in FIG. 3. When a desired elevation is displayed on a 2D map, the user can select position on the 2D map, the position indicating an X, Y and Z location by the use of a pointing device, such as a mouse or a touch screen. Once the location is selected, the system can add a virtual reality object, such as a beacon, at the selected location.

Figure 6:
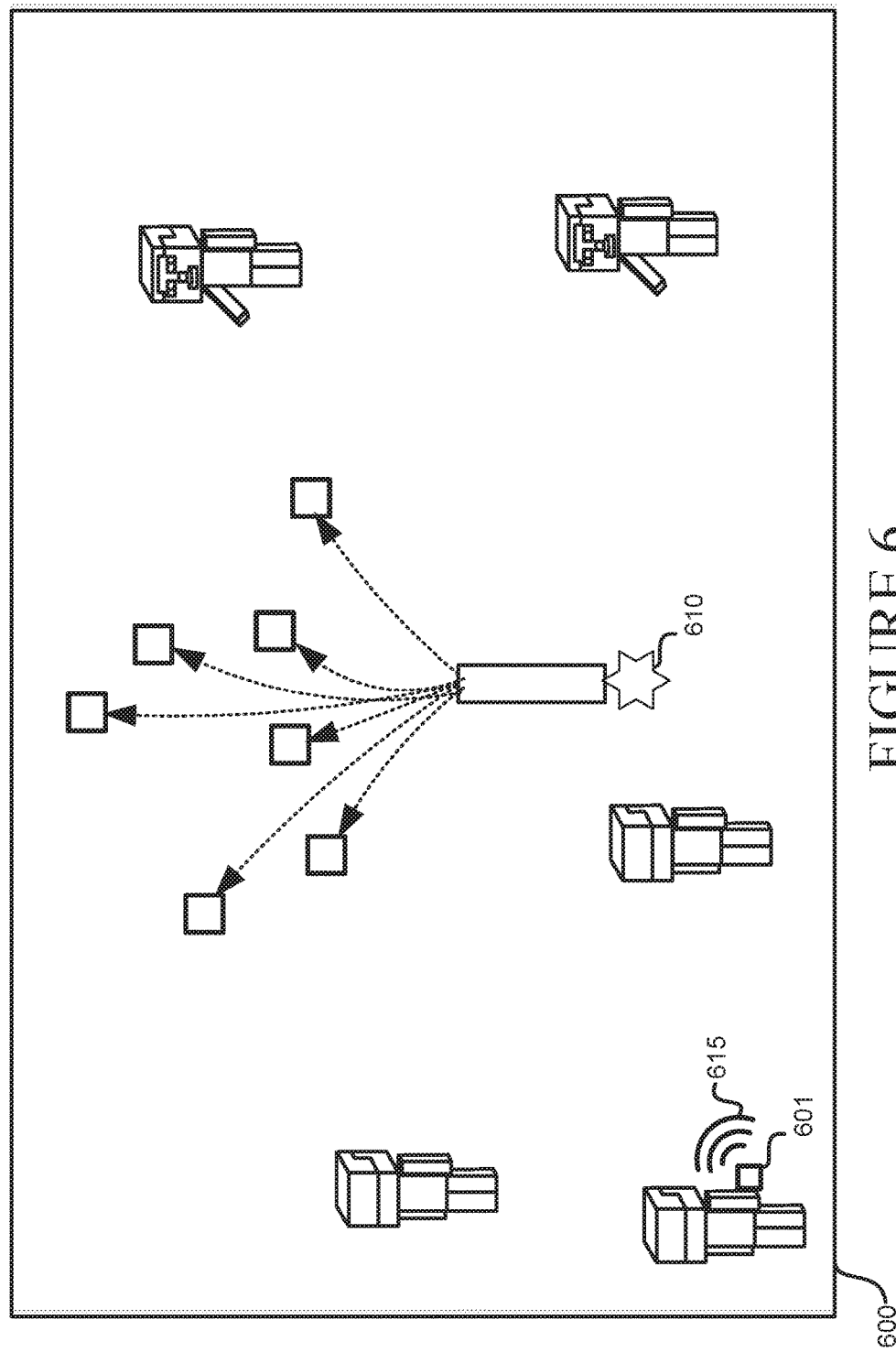
FIG. 6 shows an example of a homing beacon calling a number of players to a position.

The data defining the selection can come from the companion application 132. The method can also include generating an audio signal having a tempo, such as pulse or tick sound, wherein the tempo is based, at least in part, on a direction a virtual object, e.g., a player, is moving relative to the position. In some configurations, the tempo increases when the virtual object is moving toward the position. In addition, the tempo can decrease when the virtual object is moving away from the position. The audio signal having the tempo can be a component of an audio channel that is generated for other sounds of a three-dimensional virtual environment. In one example, as shown in FIG. 6, the audio signal can appear to come from a virtual device 601 that is held by a virtual player in the three-dimensional virtual environment. A graphical element 615 depicting a representation of an audio signal can also be displayed.

In another example, a homing beacon can include the generation of a graphical indicator 610 within the three-dimensional virtual environment bringing highlight to the position. The graphical indicator can be a graphical representation of a flare expanding in one or more directions appearing to originate from the selected position. By the use of such techniques, a user, such as a teacher operating the companion application 132, can assemble groups of players in a particular area and help players navigate through complex three-dimensional virtual environments.

Figure 7:
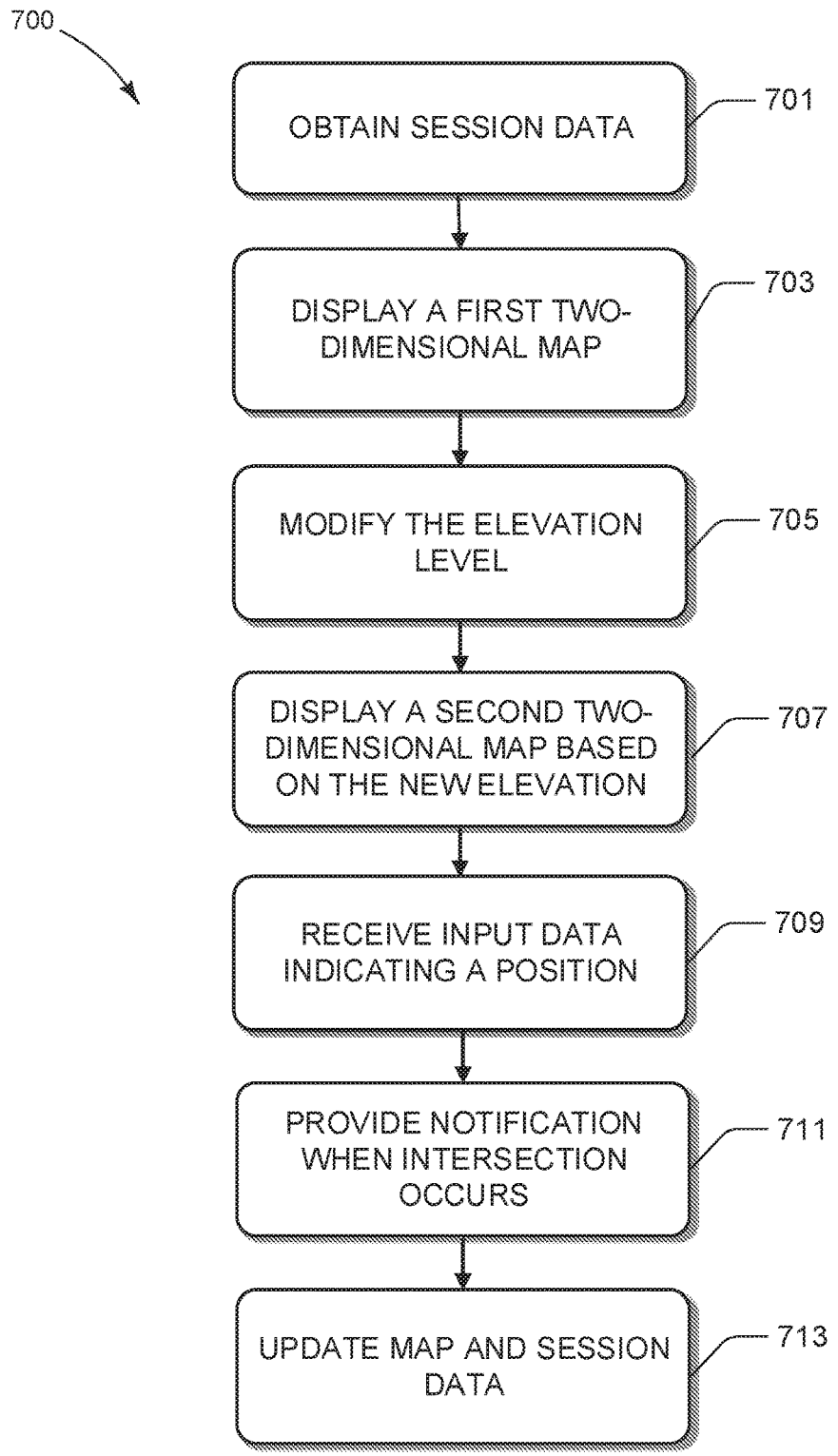
FIG. 7 illustrates a flow diagram of a routine for enabling administrative control features for hosted game sessions.

Turning now to FIG. 7, aspects of a routine 700 for providing navigation and interaction controls for three-dimensional environments are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 700 are described herein as being implemented, at least in part, by an application, component and/or circuit, such as the companion application 132 and/or the game application 131. In some configurations, the companion application 132 and/or the game application 131 can be a dynamically linked library (DLL), a statically linked library, functionality produced by an application programing interface (API), a compiled program, an interpreted program, a script or any other executable set of instructions. Data, such as the access request 201, credentials 202, permission data 203, control commands 205, gain data 204, and other data, received by the companion application 132 and/or the game application 131 can be stored in a data structure in one or more memory components. Data can be retrieved from the data structure by addressing links or references to the data structure.

Figure 8:
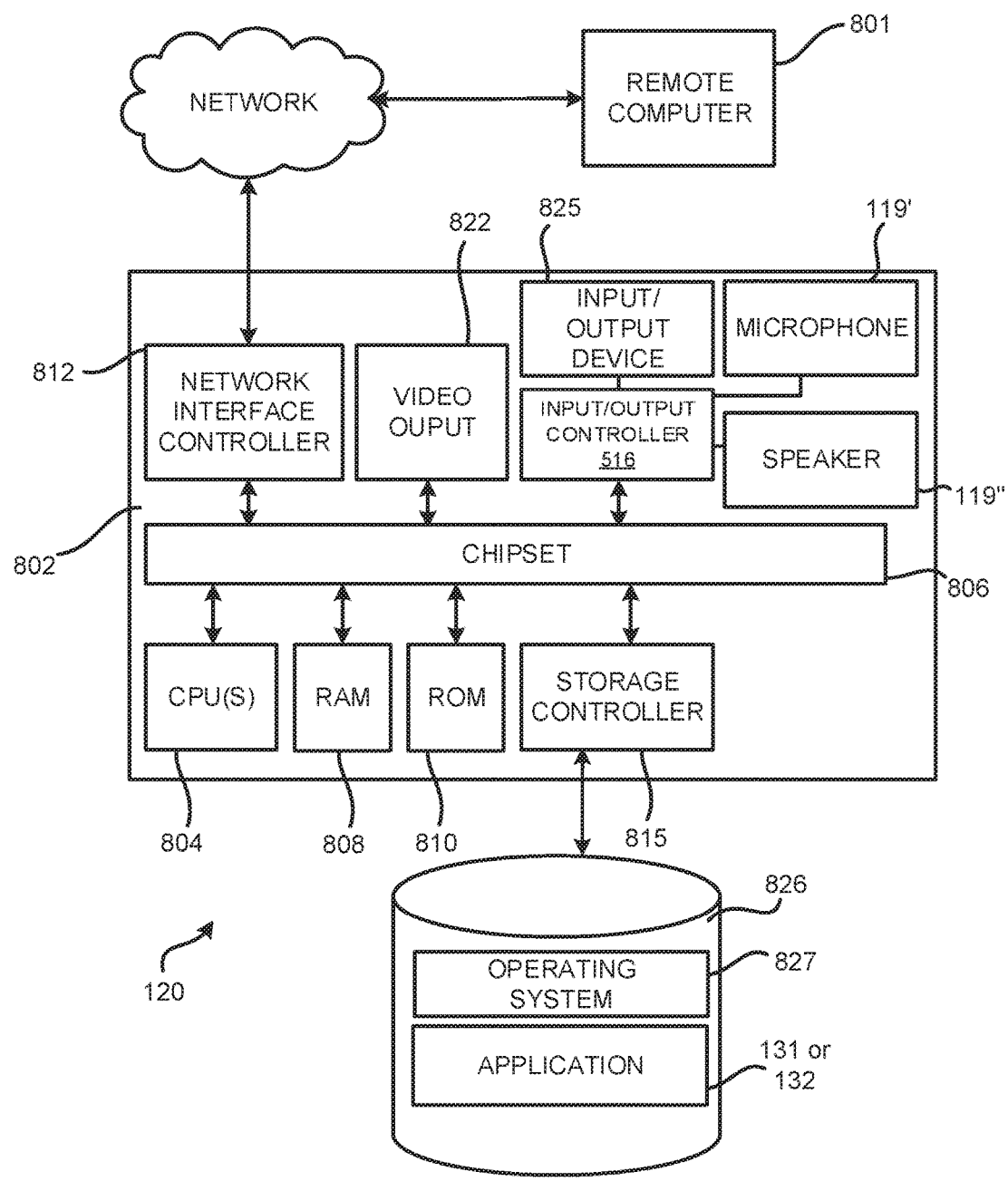
FIG. 8 is a computer architecture diagram illustrating an illustrative computer hardware and software architecture for a computing system capable of implementing aspects of the techniques and technologies presented herein.

Although the following illustration refers to the components of FIG. 1 and FIG. 8, it can be appreciated that the operations of the routine 700 may be also implemented in many other ways. For example, the routine 700 may be implemented, at least in part, by a processor of another remote computer or a local circuit. In addition, one or more of the operations of the routine 700 may alternatively or additionally be implemented, at least in part, by a chipset working alone or in conjunction with other software modules. Any service, circuit or application suitable for providing the techniques disclosed herein can be used in operations described herein.

With reference to FIG. 7, the routine 700 begins at operation 701, where a system obtains, e.g., receives or generates, session data defining a three-dimensional virtual reality environment. In some embodiments, the session data defines coordinates of a viewing area of a user and coordinates defining a position of a virtual reality object. As described above and shown in FIG. 4B, a viewing area 410 provides a perspective view of the three-dimensional virtual reality environment. The first-person view of a user can be displayed in a user interface, as shown in FIGS. 5A-5D.

Next, at operation 703, the system displays a first two-dimensional map using two dimensions (X, Y) of a three-dimensional virtual environment. The display of the first two-dimensional map is at an elevation level based, at least in part, on a third dimension (Z) of the three-dimensional virtual environment. An example of a first two-dimensional map is shown in FIG. 4A and FIG. 3. As shown, operation 703 can include the display of an elevation graphical element 305 for receiving a control input for modifying the elevation level.

At operation 705, the system can modify the elevation level to a new elevation level in response to receiving the control input. An example of a control input can include receiving data from the actuation of a slide bar, processing of a voice command, or receiving any suitable data indicating a new elevation within a virtual reality environment.

Next, at operation 707, in response to receiving the control input, the system can display a second two-dimensional map using the two dimensions (X, Y) of the three-dimensional virtual environment, wherein the display of the second two-dimensional map is at the new elevation level. An example of the second two-dimensional map is shown in FIG. 4B and in FIG. 3.

At operation 709, the system can receive input data comprising a set of coordinates defining a new position for the virtual reality object. In one illustrative example, the input data can be in the form of a drag-and-drop command indicating movement of a virtual reality object (also referred to herein as an "object"). An object can be an avatar representing a player or user, or the object can be any other item displayed as part of the virtual reality environment. The input data can be in any suitable format, including a voice command, a text command, or any other format indicating a location or position for a virtual reality object.

At operation 711, the system provides notification when the set of coordinates defining the new position intersects with the coordinates of the viewing area of the user. An example of this intersection is shown in FIG. 4B. A notification can include, but is not limited to, a process for bringing highlight to a virtual reality object being moved. When the object being moved is an avatar or representation of a remote user, embodiments herein can involve communicating a notification to the remote user. In some embodiments, the system can also provide a notification by generating a sound or modifying at least one viewing property of a graphical element of a user interface. A viewing property can include a color, brightness, thickness of an outline, etc.

Next, at operation 713, the system can update the display of a map and update the session data, where an update defines the position for the virtual reality object being moved. The position of the object can be at or near the new position. In some embodiments, the system may prompt the user to confirm a move by generating a graphical element, such as a menu item, or communicating a voice command prompting a user to confirm the move. In such embodiments, the system can receive a confirmation input from the user, and in response to the confirmation put, the system can update the display and/or the session data indicating the move. As described herein, in some embodiments, a display of an object being moved can involve the generation of a silhouette or other graphical element indicating movement of an object.

FIG. 8 shows additional details of an example computer architecture for the components shown in FIG. 1 capable of executing the program components described above. The computer architecture shown in FIG. 8 illustrates aspects of a system, such as a game console, conventional server computer, workstation, desktop computer, laptop, tablet, phablet, network appliance, personal digital assistant ("PDA"), e-reader, digital cellular phone, or other computing device, and may be utilized to execute any of the software components presented herein. For example, the computer architecture shown in FIG. 8 may be utilized to execute any of the software components described above. Although some of the components described herein are specific to the computing devices 120, it can be appreciated that such components, and other components may be part of any suitable remote computer 801, such as the authentication system 115 or another computing device 120.

The computing device 120 includes a baseboard 802, or "motherboard," which is a printed circuit board to which a multitude of components or devices may be connected by way of a system bus or other electrical communication paths. In one illustrative embodiment, one or more central processing units ("CPUs") 804 operate in conjunction with a chipset 806. The CPUs 804 may be standard programmable processors that perform arithmetic and logical operations necessary for the operation of the computing device 120.

The CPUs 804 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a RAM 808, used as the main memory in the computing device 120. The chipset 806 may further provide an interface to a computer-readable storage medium such as a read-only memory ("ROM") 810 or non-volatile RAM ("NVRAM") for storing basic routines that help to startup the computing device 120 and to transfer information between the various components and devices. The ROM 810 or NVRAM may also store other software components necessary for the operation of the computing device 120 in accordance with the embodiments described herein.

The computing device 120 may operate in a networked environment using logical connections to remote computing devices and computer systems through a network, such as the local area network. The chipset 806 may include functionality for providing network connectivity through a network interface controller (NIC) 812, such as a gigabit Ethernet adapter. The NIC 812 is capable of connecting the computing device 120 to other computing devices over the network. It should be appreciated that multiple NICs 812 may be present in the computing device 120, connecting the computer to other types of networks and remote computer systems. The network allows the computing device 120 to communicate with remote services and servers, such as the remote computer 801. As can be appreciated, the remote computer 801 may host a number of services such as the XBOX LIVE gaming service provided by MICROSOFT CORPORATION of Redmond Wash. In addition, as described above, the remote computer 801 may mirror and reflect data stored on the computing device 120 and host services that may provide data or processing for the techniques described herein.

The computing device 120 may be connected to a mass storage device 826 that provides non-volatile storage for the computing device. The mass storage device 826 may store system programs, application programs, other program modules, and data, which have been described in greater detail herein. The mass storage device 826 may be connected to the computing device 120 through a storage controller 815 connected to the chipset 806. The mass storage device 826 may consist of one or more physical storage units. The storage controller 815 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 826, other storage media and the storage controller 815 may include MultiMediaCard (MMC) components, eMMC components, Secure Digital (SD) components, PCI Express components, or the like.

The computing device 120 may store data on the mass storage device 826 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 826 is characterized as primary or secondary storage, and the like.

For example, the computing device 120 may store information to the mass storage device 826 by issuing instructions through the storage controller 815 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 120 may further read information from the mass storage device 826 by detecting the physical states or characteristics of one or more particular locations within the physical storage units.

In addition to the mass storage device 826 described above, the computing device 120 may have access to other computer-readable media to store and retrieve information, such as program modules, data structures, or other data.

Thus, although the companion application 132, the game application 131, other data and other modules are depicted as data and software stored in the mass storage device 826, it should be appreciated that these components and/or other modules may be stored, at least in part, in other computer-readable storage media of the computing device 120. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computing device 120.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computing device 120. For purposes of the claims, the phrase "computer storage medium," "computer-readable storage medium," and variations thereof, does not include waves or signals per se and/or communication media.

The mass storage device 826 may store an operating system 827 utilized to control the operation of the computing device 120. According to one embodiment, the operating system comprises a gaming operating system. According to another embodiment, the operating system comprises the WINDOWS® operating system from MICROSOFT Corporation. According to further embodiments, the operating system may comprise the UNIX, ANDROID, WINDOWS PHONE or iOS operating systems, available from their respective manufacturers. It should be appreciated that other operating systems may also be utilized. The mass storage device 826 may store other system or application programs and data utilized by the computing devices 120, such as the game application 131, companion application 132, game data 204, control commands 205, and/or any of the other software components and data described above. The mass storage device 826 might also store other programs and data not specifically identified herein.

In one embodiment, the mass storage device 826 or other computer-readable storage media is encoded with computer-executable instructions which, when loaded into the computing device 120, transform the computer from a general-purpose computing system into a special-purpose computer capable of implementing the embodiments described herein.

These computer-executable instructions transform the computing device 120 by specifying how the CPUs 804 transition between states, as described above. According to one embodiment, the computing device 120 has access to computer-readable storage media storing computer-executable instructions which, when executed by the computing device 120, perform the various routines described above with regard to FIG. 7 and the other figures. The computing device 120 might also include computer-readable storage media for performing any of the other computer-implemented operations described herein.

The computing device 120 may also include one or more input/output controllers 816 for receiving and processing input from a number of input devices, such as a keyboard, a mouse, a microphone, a headset, a touchpad, a touch screen, an electronic stylus, or any other type of input device. Also shown, the input/output controllers 816 is in communication with an input/output device 825. The input/output controller 816 may provide output to a display device, such as a computer monitor, a flat-panel display, a digital projector, a printer, a plotter, or other type of output device. The input/output controller 816 may provide input communication with other devices such as a microphone 119', a speaker 119", game controllers and/or audio devices. In addition, or alternatively, a video output 822 may be in communication with the chipset 806 and operate independent of the input/output controllers 816. It will be appreciated that the computing device 120 may not include all of the components shown in FIG. 8, may include other components that are not explicitly shown in FIG. 8, or may utilize an architecture completely different than that shown in FIG. 8.

The disclosure presented herein may be considered in view of the following examples.

Example A

A system executing an application for managing session data defining a three-dimensional virtual reality environment, wherein the session data defines coordinates of a viewing area of a user and coordinates defining a position of a virtual reality object, wherein the viewing area provides a perspective view of the three-dimensional virtual reality environment, the system comprising: a processor; and a memory in communication with the processor, the memory having computer-readable instructions stored thereupon that, when executed by the processor, cause the processor to display a first two-dimensional map using two dimensions (X, Y) of a three-dimensional virtual environment, wherein the display of the first two-dimensional map is at an elevation level based, at least in part, on a third dimension (Z) of the three-dimensional virtual environment; display an elevation graphical element for receiving a control input for modifying the elevation level; modify the elevation level to a new elevation level in response to receiving the control input; display a second two-dimensional map using the two dimensions (X, Y) of the three-dimensional virtual environment, wherein the display of the second two-dimensional map is at the new elevation level; receive input data comprising a set of coordinates defining a new position for the virtual reality object; determine when the set of coordinates defining the new position intersects with the coordinates of the viewing area of the user; and generate a notification when the set of coordinates defining the new position intersects with the coordinates of the viewing area of the user.

Example B the system of example A, wherein the instructions further cause the processor to generate an update for modifying the session data, wherein the update defines the position for the virtual reality object at or near the new position.

Example C the system of examples A and B, wherein the notification communicates a user option for providing a confirmation input to move the object, and wherein the instructions further cause the processor to: receive a confirmation input to move the object to the position at or near the new position; and generate the update for modifying the session data in response to receiving the confirmation input.

Example D the system of examples A through C, wherein the instructions further cause the processor to update the second two-dimensional map to display a rendering of the virtual reality object at or near the new position.

Example E the system of examples A through D, wherein the instructions further cause the processor to generate display data defining a display of the viewing area of the user, wherein generating the notification comprises displaying a graphical element representing a flashing silhouette of the virtual reality object within the viewing area of the user.

Example F the system of examples A through E, wherein the notification comprises a display of a graphical element indicating the new position.

Example G

A system, comprising: a processor; and a memory in communication with the processor, the memory having computer-readable instructions stored thereupon that, when executed by the processor, cause the processor to receive session data from a host computer, wherein the session data defining a three-dimensional virtual reality environment, wherein the session data defines coordinates of a viewing area of a user and coordinates defining a position of a virtual reality object, wherein the viewing area provides a perspective view of the three-dimensional virtual reality environment; display a first two-dimensional map using two dimensions (X, Y) of a three-dimensional virtual environment, wherein the display of the first two-dimensional map is at a first elevation level based, at least in part, on a third dimension (Z) of the three-dimensional virtual environment; display an elevation graphical element for receiving a control input for receiving data indicating a second elevation level; display a second two-dimensional map using the two dimensions (X, Y) of the three-dimensional virtual environment, wherein the display of the second two-dimensional map is at the second elevation level; receive input data comprising a set of coordinates defining a new position for the virtual reality object; determine when the set of coordinates defining the new position intersects with the coordinates of the viewing area of the user; and generate a notification when the set of coordinates defining the new position intersects with the coordinates of the viewing area of the user.

Example H the system of example G, wherein the instructions further cause the processor to: generate an update for modifying the session data, wherein the update defines the position for the virtual reality object at or near the new position; and transmit the update for modifying the session data to the host computer.

Example I the system of examples G and H: wherein the notification communicates a user option for providing a confirmation input to move the object, and wherein the instructions further cause the processor to: receive a confirmation input to move the object to the position at or near the new position; generate the update for modifying the session data in response to receiving the confirmation input; and transmit the update for modifying the session data to the host computer.

Example J the system of examples G through I: wherein the instructions further cause the processor to displaying the virtual reality object in the first two-dimensional map; receive a selection of the virtual reality object while displaying the virtual reality object in the first two-dimensional map, wherein the display of the virtual reality object is maintained in the second two-dimensional map.

Example K the system of examples G through J: wherein the instructions further cause the processor to generate display data defining a display of the viewing area of the user, wherein generating the notification comprises displaying a graphical element representing a flashing silhouette of the virtual reality object within the viewing area of the user.

Example L

A computer-implemented method operating on a computing device for managing session data defining a three-dimensional virtual reality environment, comprising: displaying a first two-dimensional map using two dimensions (X, Y) of the three-dimensional virtual environment, wherein the display of the first two-dimensional map is at an elevation level based, at least in part, on a third dimension (Z) of the three-dimensional virtual environment; displaying an elevation graphical element for receiving an input for modifying the elevation level; modifying the elevation level to a new elevation level in response to receiving the input; and displaying a second two-dimensional map using the two dimensions (X, Y) of the three-dimensional virtual environment, wherein the display of the second two-dimensional map is at the new elevation level.

Example M the system of example L, wherein the session data defines coordinates of a viewing area of a user and coordinates defining a position of a virtual reality object, wherein the viewing area provides a first-person perspective view of the three-dimensional virtual reality environment, wherein the computer-implemented method further comprises: receiving input data comprising a set of coordinates defining a new position for the virtual reality object; determining when the set of coordinates defining the new position intersects with the coordinates of the viewing area of the user; generating a notification when the set of coordinates defining the new position intersects with the coordinates of the viewing area of the user; and generating an update for modifying the session data, wherein the update defines the position for the virtual reality object at or near the new position.

Example N the system of examples L and M: wherein the notification communicates a user option for providing a confirmation input to move the object, and wherein the computer-implemented method further comprises: receiving a confirmation input to move the object to the position at or near the new position; and generating the update for modifying the session data in response to receiving the confirmation input.

Example O the system of examples L through N: further comprising updating the second two-dimensional map to display a rendering of the virtual reality object at or near the new position.

Example P the system of examples L through O, further comprising generating display data defining a display of the viewing area of the user, wherein generating the notification comprises displaying a graphical element representing a flashing silhouette of the virtual reality object within the viewing area of the user.

Example Q the system of examples L through P, wherein the notification comprises a display of a graphical element indicating the new position.

Example R the system of examples L through Q, wherein the computer-implemented method further comprises: receiving input data comprising a set of coordinates defining a position for a beacon; updating the second two-dimensional map to display a rendering of the beacon; and generating an update for modifying the session data, wherein the update defines the position for the beacon.

Example S the system of examples L through R, further comprising: modifying session data based on the update; generating display data defining a display of the session data; and transmitting the display data to at least one remote client computing device for displaying of the display data on a display device.

Example T the system of examples L through S, wherein the update for modifying the session data comprises attributes for an audio signal having a tempo that decreases or increases based on a direction of an object in relation to the position of the beacon.

Example U the system of examples A through J, wherein the instructions further cause the processor to display the virtual reality object in the first two-dimensional map at the first elevation level; receive a selection of the virtual reality object while displaying the virtual reality object in the first two-dimensional map; and display an augmented rendering of the virtual reality object in the second two-dimensional map at the second elevation level.

Example V the system of examples A through J and example U, wherein the instructions further cause the processor to display a graphical rendering of the viewing area in the second two-dimensional map at the second elevation level.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system for assisting a first user to move a virtual reality object into a viewing area of a second user, the system comprising:
   a processor; and
   a memory in communication with the processor, the memory comprising session data defining a three-dimensional virtual reality environment, wherein the session data defines coordinates of the viewing area of the second user and coordinates defining a first position of the virtual reality object, wherein the viewing area provides a perspective view of the three-dimensional virtual reality environment for the second user, the memory having computer-readable instructions stored thereupon that, when executed by the processor, cause the processor to
   display a first two-dimensional map using two dimensions (X, Y) of the three-dimensional virtual environment, wherein the display of the first two-dimensional map displays objects at a selected level of a third dimension (Z) of the three-dimensional virtual environment;
   display a level graphical element for receiving a control input from the first user for modifying the selected level;
   modify the selected level to a new level in response to receiving the control input;
   display a second two-dimensional map using the two dimensions (X, Y) of the three-dimensional virtual environment, wherein the display of the second two-dimensional map is at the new level;
   receive input data from the first user comprising a set of coordinates defining a second position for the virtual reality object, wherein the set of coordinates includes the new level;
   determine when the set of coordinates defining the second position intersects with the coordinates of the viewing area of the second user; and
   in response to determining that the set of coordinates defining the second position intersects with the coordinates of the viewing area of the second user, generate a notification on a display device associated with the first user, the notification indicating that the virtual reality object being moved by the first user is within the viewing area of the second user.

2. The system of claim 1, wherein the instructions further cause the processor to generate an update for the session data, wherein the update locates the virtual reality object at the second position.

3. The system of claim 1, wherein the notification communicates a user option for providing a confirmation input to move the object, and wherein the instructions further cause the processor to:
   receive a confirmation input to move the object to the second position; and
   generate the update for modifying the session data in response to receiving the confirmation input.

4. The system of claim 1, wherein the instructions further cause the processor to update the second two-dimensional map to display a rendering of the virtual reality object at the second position.

5. The system of claim 1, wherein the instructions further cause the processor to generate display data defining a display of the viewing area of the second user, wherein generating the notification comprises displaying a graphical element representing a flashing silhouette of the virtual reality object within the viewing area of the second user.

6. The system of claim 1, wherein the notification comprises a display of a graphical element indicating the second position.

7. A system for assisting a first user to move a virtual reality object into a viewing area of a second user, comprising:
   a processor; and
   a memory in communication with the processor, the memory having computer-readable instructions stored thereupon that, when executed by the processor, cause the processor to
   receive session data from a host computer, wherein the session data defines a three-dimensional virtual reality environment, wherein the session data defines coordinates of the viewing area of the second user and coordinates defining a first position of the virtual reality object, wherein the viewing area provides a perspective view of the three-dimensional virtual reality environment for the second user;
   display a first two-dimensional map using two dimensions (X, Y) of the three-dimensional virtual reality environment, wherein the display of the first two-dimensional map displays objects at a selected level of a third dimension (Z) of the three-dimensional virtual environment;
   display a level graphical element for receiving a control input from the first user for modifying the selected level;
   modify the selected level to a new level in response to receiving the control input;
   display a second two-dimensional map using the two dimensions (X, Y) of the three-dimensional virtual environment, wherein the display of the second two-dimensional map is at the new level;
   receive input data from the first user comprising a set of coordinates defining a second position for the virtual reality object;
   determine when the set of coordinates defining the second position intersects with the coordinates of the viewing area of the second user; and
   in response to determining that the set of coordinates defining the second position intersects with the coordinates of the viewing area of the second user, generate a notification on a display device associated with the first user, the notification indicating that the virtual reality object being moved by the first user is within the viewing area of the second user.

8. The system of claim 7, wherein the instructions further cause the processor to:
generate an update for modifying the session data, wherein the update indicates that the virtual reality object is at or near the second position; and
transmit the update for modifying the session data to the host computer.

9. The system of claim 7, wherein the notification communicates a user option for providing a confirmation input to move the object, and wherein the instructions further cause the processor to:
receive a confirmation input to move the object to the second position;
generate the update for modifying the session data in response to receiving the confirmation input; and
transmit the update for modifying the session data to the host computer.

10. The system of claim 7, wherein the instructions further cause the processor to:
display the virtual reality object in the first two-dimensional map at the selected level;
receive a selection of the virtual reality object while displaying the virtual reality object in the first two-dimensional map; and
display an augmented rendering of the virtual reality object in the second two-dimensional map at the new level.

11. The system of claim 7, wherein the instructions further cause the processor to generate display data defining a display of the viewing area of the second user, wherein generating the notification comprises displaying a graphical element representing a flashing silhouette of the virtual reality object within the viewing area of the second user.

12. A computer-implemented method for assisting a first user to move a virtual reality object into a viewing area of a second user, the computer-implemented method operating on a computing device for managing session data defining a three-dimensional virtual reality environment, comprising:
displaying a first two-dimensional map using two dimensions (X, Y) of the three-dimensional virtual environment, wherein the display of the first two-dimensional map displays virtual objects at a selected level of a third dimension (Z) of the three-dimensional virtual environment;
displaying a level graphical element for receiving an input from the first user for modifying the selected level;
modifying the selected level to a new level in response to receiving the input;
displaying a second two-dimensional map using the two dimensions (X, Y) of the three-dimensional virtual environment, wherein the display of the second two-dimensional map displays other virtual objects at the new level;
receiving input data from the first user comprising a set of coordinates defining a second position for the virtual reality object, wherein the set of coordinates includes the new level;
determining when the set of coordinates defining the second position intersects with the coordinates of the viewing area of the second user; and
in response to determining that the set of coordinates defining the second position intersects with the coordinates of the viewing area of the second user, generating a notification on a device associated with the first user, the notification indicating that the virtual reality object being moved by the first user is within the viewing area of the second user.

13. The computer-implemented method of claim 12, wherein the session data defines coordinates of a viewing area of the second user and coordinates indicating defining a first position of a virtual reality object, wherein the viewing area provides a first-person perspective view of the three-dimensional virtual reality environment, wherein the computer-implemented method further comprises:
receiving input data comprising a set of coordinates defining a second position for the virtual reality object;
determining when the set of coordinates defining the second position intersects with the coordinates of the viewing area of the second user;
generating a notification when the set of coordinates defining the second position intersects with the coordinates of the viewing area of the second user; and
generating an update for modifying the session data, wherein the update indicates that the virtual reality object is at or near the second position.

14. The computer-implemented method of claim 13, wherein the notification communicates a user option for providing a confirmation input to move the object, and wherein the computer-implemented method further comprises:
receiving a confirmation input to move the object to the second position; and
generating the update for modifying the session data in response to receiving the confirmation input.

15. The computer-implemented method of claim 13, further comprising updating the second two-dimensional map to display a rendering of the virtual reality object at or near the second position.

16. The computer-implemented method of claim 13, further comprising generating display data defining a display of the viewing area of the second user, wherein generating the notification comprises displaying a graphical element representing a flashing silhouette of the virtual reality object within the viewing area of the second user.

17. The computer-implemented method of claim 13, wherein the notification comprises a display of a graphical element indicating the second position.

18. The computer-implemented method of claim 12, wherein the computer-implemented method further comprises:
receiving input data comprising a set of coordinates defining a position for a beacon;
updating the second two-dimensional map to display a rendering of the beacon; and
generating an update for modifying the session data, wherein the update defines the position for the beacon.

19. The computer-implemented method of claim 18, further comprising:
modifying session data based on the update;
generating display data defining a display of the session data; and
transmitting the display data to at least one remote client computing device for displaying of the display data on a display device.

20. The computer-implemented method of claim 18, wherein the update for modifying the session data comprises attributes for an audio signal having a tempo that decreases or increases based on a direction of an object in relation to the position of the beacon.

* * * * *